(12) United States Patent
Chiu et al.

(10) Patent No.: US 7,340,678 B2
(45) Date of Patent: Mar. 4, 2008

(54) SYSTEMS AND METHODS FOR CREATING AN INTERACTIVE 3D VISUALIZATION OF INDEXED MEDIA

(75) Inventors: Patrick Chiu, Menlo Park, CA (US); Andreas Girgensohn, Menlo Park, CA (US); Wolfgang Polak, Sunnyvale, CA (US); Frank Shipman, III, College Station, TX (US); Surapong Lertsithichai, Mountain View, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 808 days.

(21) Appl. No.: 10/776,618

(22) Filed: Feb. 12, 2004

(65) Prior Publication Data

US 2005/0183041 A1  Aug. 18, 2005

(51) Int. Cl.
*G06F 15/177* (2006.01)
(52) U.S. Cl. .................................................. 715/734
(58) Field of Classification Search ................ 715/734
See application file for complete search history.

(56) References Cited

U.S. PATENT DOCUMENTS

| | | | |
|---|---|---|---|
| 5,861,885 A * | 1/1999 | Strasnick et al. | 715/850 |
| 6,222,557 B1 * | 4/2001 | Pulley et al. | 345/622 |
| 6,281,898 B1 * | 8/2001 | Nikolovska et al. | 715/848 |
| 6,535,639 B1 | 3/2003 | Uchihachi et al. | |
| 6,707,454 B1 * | 3/2004 | Barg et al. | 345/440 |
| 2002/0054083 A1 | 5/2002 | Boreczky et al. | |
| 2005/0071783 A1 * | 3/2005 | Atkins | 715/851 |

OTHER PUBLICATIONS

U.S. Appl. No. 10/756,397, filed Jan. 14, 2004, Chiu et al.
Bederson, B., Schneiderman, B., Wattenberg, M. Ordered and quantum treemaps: Making effective use of 2D space to display hierarchies. *ACM Transactions on Graphics*, 21(4): 833-854 (Oct. 2002).
Benford, S.D., Snowdon, D.N., Greenhalgh, C.M., Ingram, R J., Knox, I. and Brown, C.C., VR-VIBE: A Virtual Environment for Co-operative Information Retrieval, Computer Graphics Forum, 14, (3), pp. 349-360, 1995, NCC Blackwell.
Bruls, M., Huizing, K., van Wijk, J.J. Squarified treemaps. *Proceedings of Joint Eurographics and IEEE TCVG Symposium on Visualization (TVCG 2000)*, IEEE Press, pp. 33-42.
Chiu, P., Boreczky, J., Girgenohn, A., Kimber, D. LiteMinutes: An Internet-based system for multimedia minutes. *Proceedings of Tenth World Wide Web Conference (2001)*, pp. 140-149. See http://www10.org.
Denoue, L., Chiu, P., Fuse, T. Shared text input for note taking on handheld devices. *CHI '02 Abstracts*. ACM Press, pp. 794-795.

(Continued)

*Primary Examiner*—Steven P. Sax
*Assistant Examiner*—Le Nguyen
(74) *Attorney, Agent, or Firm*—Sughrue Mion, PLLC.; Pavel I. Pogodin, Esq.

(57) ABSTRACT

A 3D graphical user interface includes a two-dimensional ground-plane layout representing the relationship between one or more leaf elements of a tree data structure. The interface further includes at least one building-like structure, each of the at least one building-like structure corresponding to a respective one of the one or more leaf elements. Each of the at least one building-like structure provides a summary of media associated with the respective one of the more leaf elements corresponding to at least one building-like structure.

18 Claims, 16 Drawing Sheets

OTHER PUBLICATIONS

Frécon, E., Smith, G. WebPath—A three-dimensional Web history, IEEE InfoVis '98, pp. 3-10.

Girgensohn, A., Boreczky, J., Wilcox, L., and Foote, J. Facilitating video access by visualizing automatic analysis. *Proceedings of interact '99*. IOS Press, pp. 205-212.

Mukhopadhyay, S. and Smith, B. Passive capture and structuring of lectures. *Proc. ACM Multimedia '99*. ACM, New York, pp. 477-487.

Card, S., Robertson, G., York, W. The WebBook and Web Forager: An information workspace for the World-Wide Web. *Proceedings of CHI '96*. ACM, New York, pp. 111-117.

Chiu, P., Kapuskar, A., Reitmeier, S., and Wilcox, L. NoteLook: Taking notes in meetings with digital video and ink. *Proceedings of ACM Multimedia '99*. ACM, New York, pp. 149-158.

Dieberger, A. A city metaphor to support navigation in complex information spaces. *Journal of Visual Languages and Computing*. 1998 (9), pp. 597-622.

Lynch, K. *The Image of the City*. MIT Press, 1960.

Mitchell, W.J., *City of Bits: Space, Place and the InfoBahn*. 1996: MIT Press.

Snowdon, D., Benford, S., Greenhalgh, C., Ingram, R., Brown, C., Fahlén, L. and Stenius, M., A 3D Collaborative Virtual Environment for Web Browsing, in *Virtual Reality Universe '97*. Westin Santa Clara Hotel, California, USA, Apr. 1997.

Uchihashi, S., Foote, J. Summarizing video using a shot importance measure and a frame-packing algorithm. *Proc. ICASSP '99*. vol. 6, pp. 3041-3044.

Yamaguchi, Y., Itoh, T., Ikehata, I., Kajinaga. Web site visualization using a hierarchical rectangle packing technique. *IEEE InfoVis '02 Poster Compendium*, pp. 58-59.

Yeung, M.M., Yeo, B.L. Video visualization for compact presentation and fast browsing of pictorial content. IEEE Transactions on Circuits and Systems for Video Technology, vol. 7, No. 5 (Oct. 1997), pp. 771-785.

Robertson, G.G., Card, S.K., Mackinlay, J.D. Information visualization using 3D interactive animation. *Comm. of the ACM*, 36 (4), (1993), 57-71.

SCI FSN file system navigator (1999), http://www.sgi.com/fun/freeware/3d_navigator.html.

SimCity game software. Maxis, Electronic Arts company (1989), http://simcity.ea.com/play/simcity-classic.php.

Benford, S., Snowdon, D., Brown, C., Reynard, G., Ingram, R. Visualising and Populating the Web: Collaborative Virtual Environments for Browsing, Searching and Inhabiting Webspace. Proc. 8th Joint European Networking Conference (JENC'8), Edinburg, May 1997.

* cited by examiner

SYSTEMS AND METHODS FOR CREATING AN INTERACTIVE 3D VISUALIZATION OF INDEXED MEDIA

BACKGROUND OF THE INVENTION

1. Field of Invention

This invention relates to systems and methods for creating an interactive 3D visualization that indexes media and summarizes the indexed media.

2. Description of Related Art

Based on increases in conventional computing speed and resource management, three-dimensional media indices are just recently becoming viable means for indexing a large amount of related media. However, the complexity of the index and information about the indexed media conveyed by the three-dimensional indices is rather limited.

For instance, SGI FSN is a file system navigator with a 3D landscape visualization. Directories are placed in a hierarchical tree layout in the landscape. Each directory in SGI FSN is represented by a pedestal. The size of the files in the directory is proportional to the pedestal height and the file age is shown by color. Files are placed on top of the directory pedestals. Each file is represented by a box.

U.S. Patent Application Ser. No. 10/756,397 describes a method for creating and updating interactive 3D visualizations of media indices wherein separate indices are located above and below a ground plane. The indices are organized in a table structure defined by two axes and provide links to the media that is indexed. Various visual characteristics of the indices reflect characteristics of the media that is indexed as well as various user defined or group defined information relating to the indexed media.

Perspective Wall is a 3D visualization that indexes files. It utilizes a 3D wall with three sections and displays card icons for the files. 3D/Rooms is a 3D index that has a 3D multi-level building floor plan in which users can select a research group and retrieve photos of members and their offices.

Finally, There are many visualizations of the World Wide Web using 3D landscapes. Most of these such as WWW3D, WebPath, and VR-VIBE use abstract geometric objects to represent documents. The Web Forager, utilizes a space that contains 3D bookcases and 3D books, that when opened, display the indexed Web pages.

SUMMARY OF THE INVENTION

Each of the above-described systems for indexing media within a three-dimensional space shares a similar shortcoming. Particularly, a user is only able to discern very general, if any, qualities of the indexed media from the visualization itself. For example, according to U.S. Patent Application Ser. No. 10/756,397 a user can determine how the media is classified within two axes or determine whether or not the media indexed is one of or a combination of graphics, text, video, etc. However, none of the above-described systems summarize the indexed media within the summary itself, such that a user can view a summary of the indexed media simply by viewing the 3D visualization of the indexed media.

Therefore, various exemplary embodiments of the systems, methods, and graphical user interfaces according to this invention provide an interactive 3D visualization wherein the surfaces of 3D objects representing indexed media provide visual summaries of the indexed media.

Various exemplary embodiments of the systems and methods according to this invention provide a 3D graphical user interface including a two-dimensional ground-plane layout representing the relationship between one or more leaf elements of a tree data structure; and at least one building-like structure, each of the at least one building-like structures corresponding to a respective one of the one or more leaf elements, wherein each of the at least one building-like structure provides a summary of media associated with the respective one of the more leaf elements corresponding to that at least one building-like structure.

Various exemplary embodiments of the systems and methods according to this invention provide a layout for a 3D visualization including inputting a tree data structure, each leaf of the tree associated with one or more forms of media; determining a plurality of candidate layouts; comparing the plurality of candidate layouts; selecting a solution layout; and constructing a 3D visualization based on the layout, wherein the representation of each leaf within the 3D visualization provides a summary of the media contained by that leaf within the input tree data structure.

BRIEF DESCRIPTION OF THE DRAWINGS

Various exemplary embodiments of systems and methods according to this invention will be described in detail, with reference to the following figures, wherein.

DETAILED DESCRIPTION OF PREFERRED EMBODIMENTS

Figure 1:
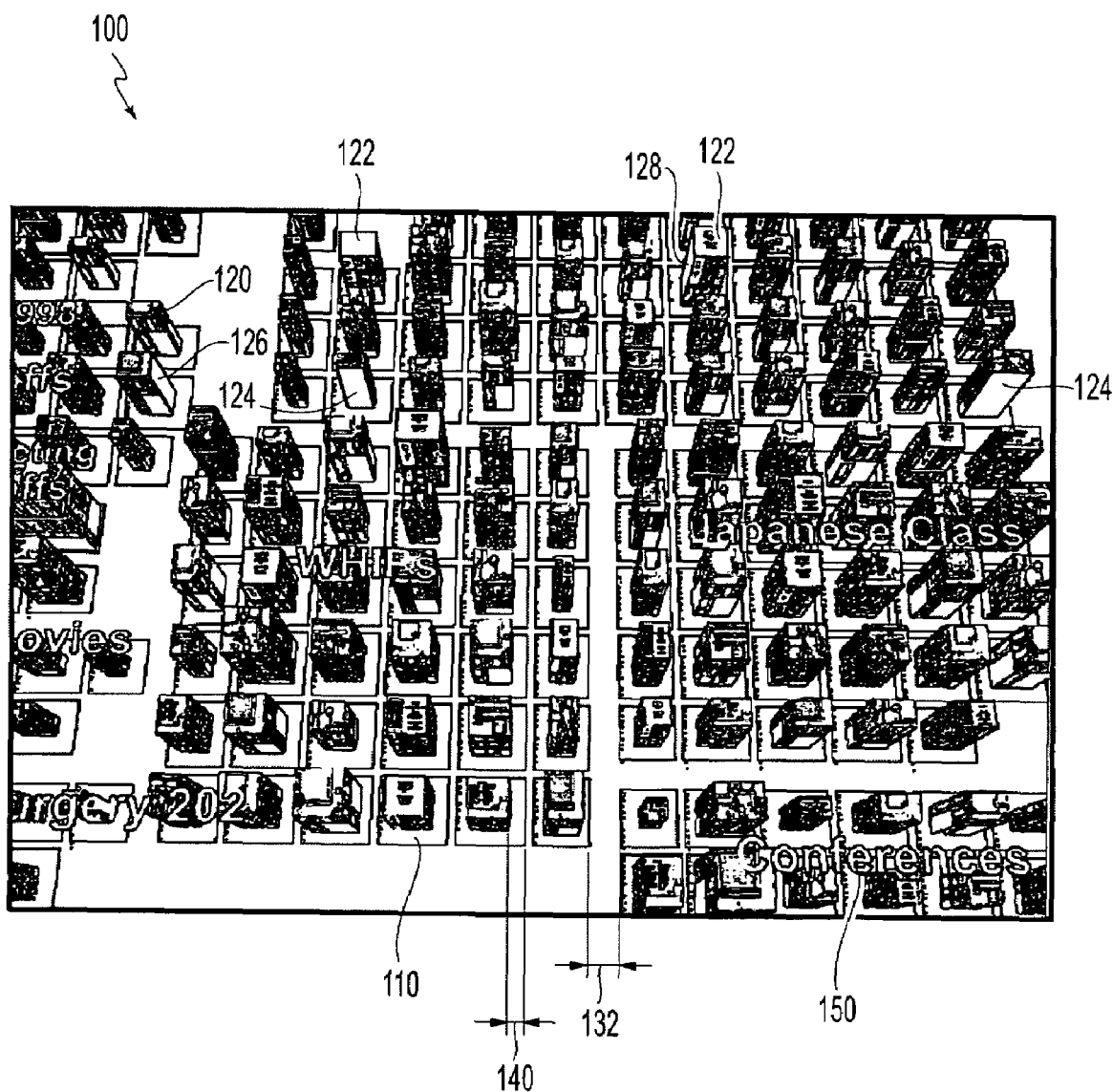
FIGS. 1 and 2 show an exemplary embodiment of a 3D visualization that utilizes substantially square and similarly sized building-like structure plots.
Figure 2:
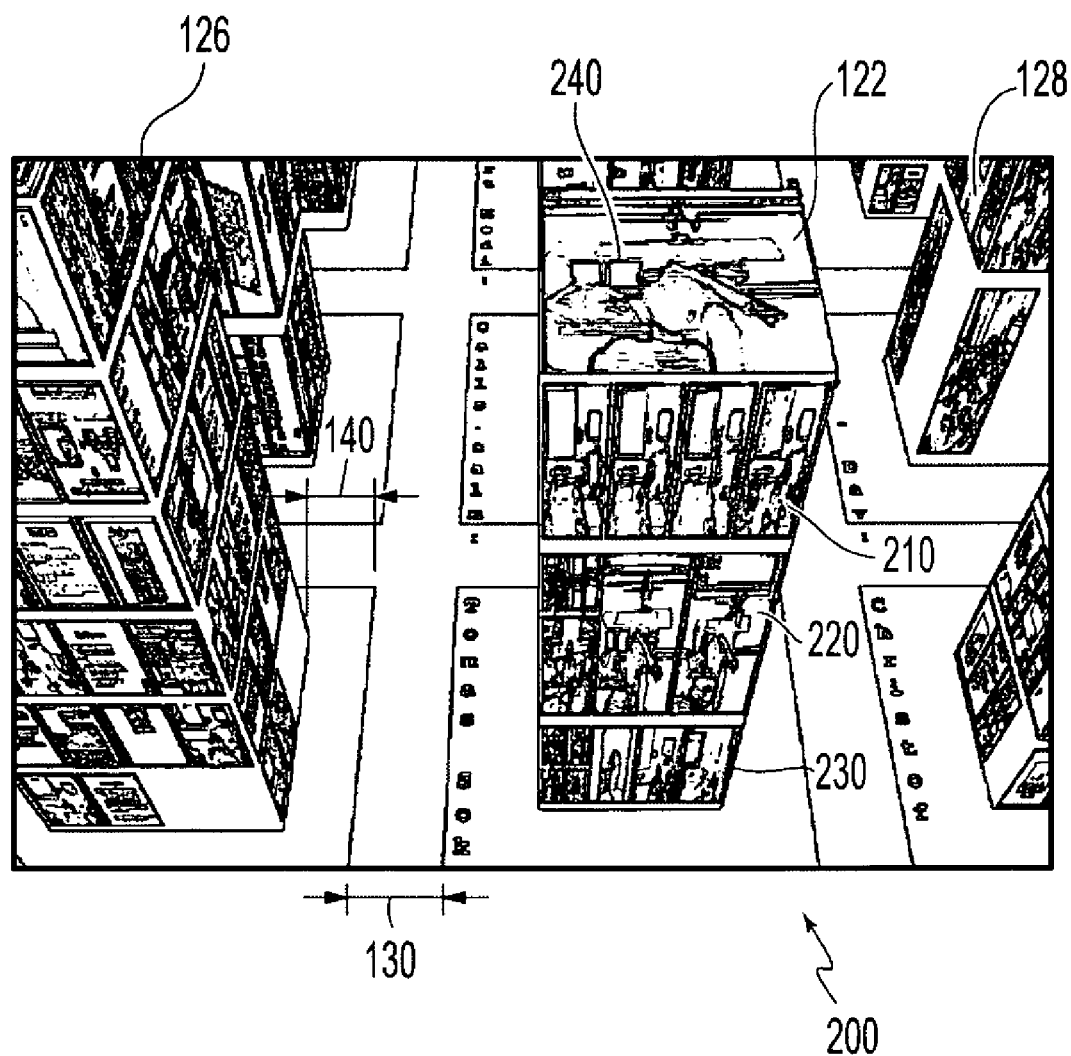
Figure 3:
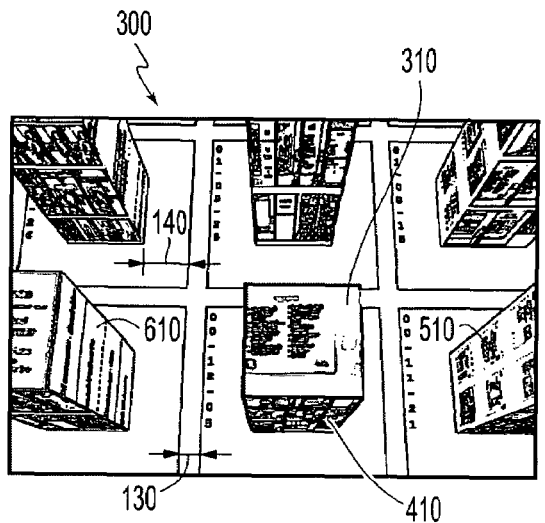
FIGS. 3-6 show a number of variations of the 3D visualization shown in FIGS. 1 and 2.
Figure 4:
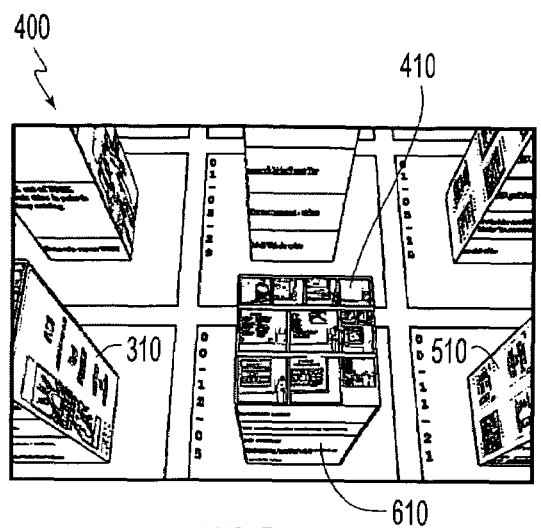
Figure 5:
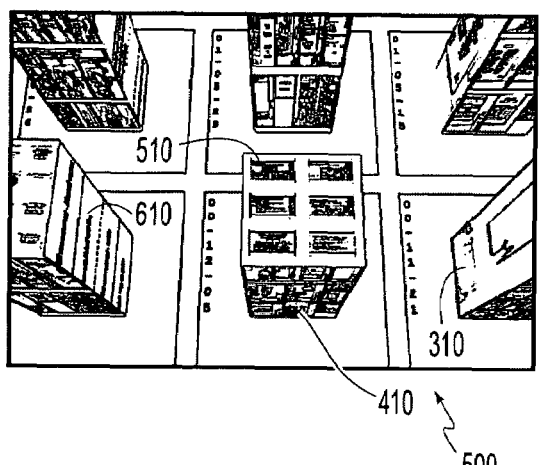
Figure 6:
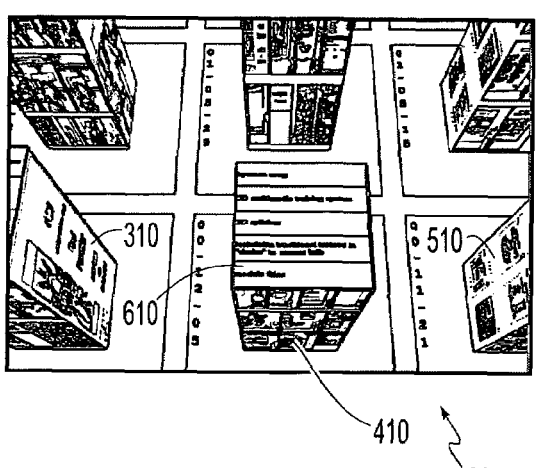

FIGS. 1 and 2 show an exemplary embodiment of a 3D visualization 100 according to this invention that utilizes substantially square and similarly sized building-like structure plots.

As shown in FIGS. 1 and 2, the 3D visualization utilizes a city metaphor in which each amount of media, indexed by a leaf in a tree data structure, is represented by a building-like structure 120. According to this exemplary embodiment, the indexed media is video. However, any other media such as text, graphics, charts, etc. may be used. The indexed media is summarized on the roof 122 and walls 124, 126, and 128 (rear not shown) of the buildings such that a user navigating the 3D visualization has an idea of the contents of each leaf without having to access that leaf. In various exemplary embodiments, the roof 122 and sides 124, 126, 128 (rear not shown)of the buildings display the same summary. Alternatively, each of the roof 122 and sides 124, 126, 128 (rear not shown) have different summaries. In various exemplary embodiments, a video is summarized by arranging key frames of the video in a predefined rectangular area (here defined by the height and width of the sides and roof of the buildings). FXPAL-IP-98-018 and U.S. patent application Ser. No. 10/392,822 describe methods for automatic video summary using key frames and are incorporated herein by reference in their entirety. Key frame video summaries work particularly well within the context of a city metaphor because each of the summary's frames resemble windows on the side of the building-like structures.

As shown in FIGS. 1 and 2, and consistent with the city metaphor, each building-like structure 120 exists on a lot 110 wherein a curb width 140 is the distance from the building-like structure to a road. In various exemplary embodiments, the curb width is inversely proportional to a numerical value associated with each indexed portion of the media. For instance, the numerical value may represent the length of the video or an importance of the video determined by the user, or a predefined group of users. As such, the indexed portions of media that have the higher numerical values will have a smaller curb width and the building-like structure will be larger.

It should be appreciated that, in other exemplary embodiments of the 3D visualization according to this invention, the numerical value may be directly proportional to the building-like structure's foot print. However, in practice this may result in building-like structures that are too thin to effectively summarize their respectively indexed media, or building-like structures that are too wide and obstruct a user's view of other buildings.

As shown in FIGS. 1 and 2, and consistent with a city metaphor, a road separates each lot 110. In various exemplary embodiments, the road width (e.g., 130, 132) represents the distance between the respective indexed media portions within the underlying tree data structure. For example, lots 110 that are separated by roads with a road width 130 are closer to one another within the tree data structure (e.g., leaves) than lots 110 that are separated by roads with road width 132 (e.g., braches).

Furthermore, in various exemplary embodiments, the height 250 of each building-like structure is proportional to a numerical value associated with each indexed portion of the media. For instance, the numerical value may represent the length of the video or an importance of the video determined by the user, or a predefined group of users.

In various exemplary embodiments, as shown in FIG. 1, text may be included in the visualization to provide labels 150 for various groups of indexed media. In various exemplary embodiments, these labels float over the building-like structures to simulate clouds, consistent with a city metaphor.

FIGS. 3-6 show a number of exemplary variations 300, 400, 500, and 600 of the visualization 100 shown in FIGS. 1 and 2. According to the variations 300, 400, 500, and 600, each leaf represented by a building-like structure is summarized by up to four types of media (single video frames 310, key frame summaries 410, slide images 510 and text 610).

In each exemplary variation 300,400, 500, and 600, a different type of media is displayed on the roof. In various exemplary embodiments of the invention, the type of media that most effectively summarizes the indexed media portion is displayed on the roof because, typically, the roof is most visible from viewpoints in which all or many of the building-like structures are visible.

Figure 7:
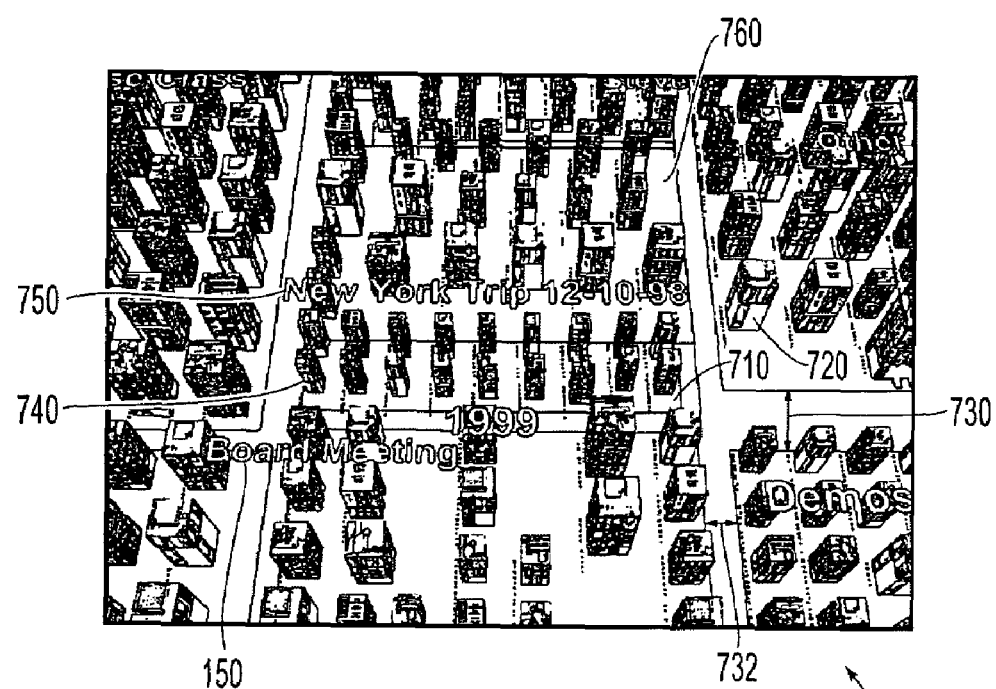
FIGS. 7 and 8 show an exemplary embodiment of a 3D visualization according to this invention that utilizes differently sized building-like structure plots.
Figure 8:
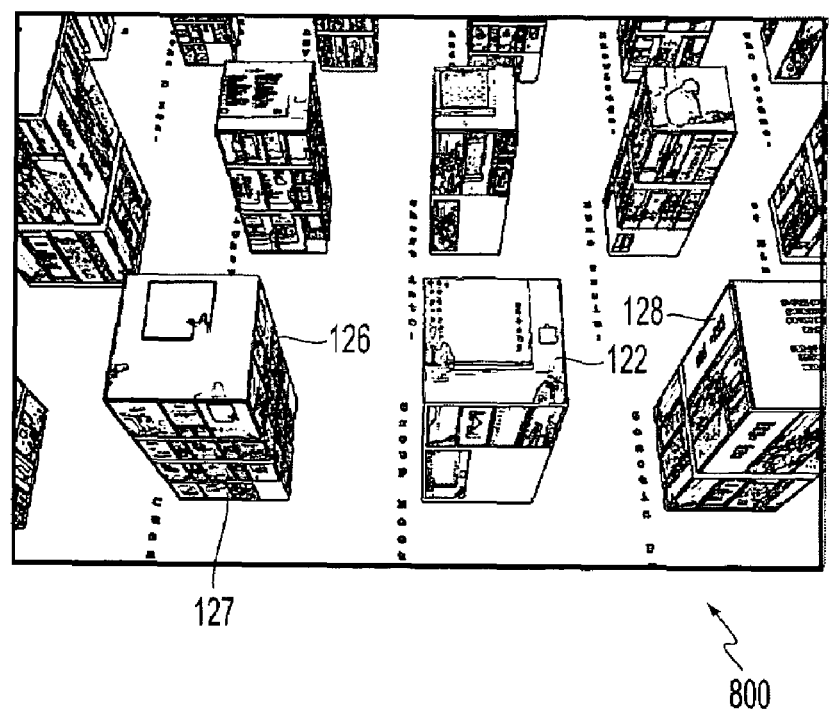

FIGS. 7 and 8 show an exemplary embodiment of a 3D visualization according to this invention that utilizes differently sized building-like structure plots wherein the size of each building-like structure's plot is proportional to some numerical quality of the index media represented by that building-like structure.

Similar to the previously described embodiments of FIGS. 1-6, the building-like structures have curb widths and building heights that are proportional to some numerical qualities of the indexed media portion (leaf) represented by the building-like structures. Again, similar to the previously described embodiments, FIG. 7 shows road widths 732 that represent the distance between the respective indexed media portions within the tree structure.

As shown in FIGS. 7 and 8, according to this exemplary embodiment the plots 710 of each building-like structure for each leaf are arranged into larger plots 740, 760 wherein each larger plot 740, 760 includes all of the plots representing its subnodes according to the underlying tree data structure (e.g., leaf plot 710 is contained n larger plot 740 which is contained in larger plot 760). Text may be included in the visualization to provide labels 150 for various groups of indexed media. In various exemplary embodiments, these labels 150 float over the building-like structures to simulate clouds, consistent with a city metaphor.

In order to facilitate the use of the above-described 3D visualization according to various exemplary embodiments of the invention as a graphical user interface, various exemplary embodiments provide a number of functions that facilitate the effective viewing of and interaction with the various portions of the 3D visualizations. Various exemplary embodiments, enable a user of the visualization to change the viewing angles, viewing distance, and view point. For example, FIG. 1 shows the visualization of the first embodiment, in which the view is relatively distant and tilted to primarily display the fronts 124 and tops 122 of the building-like structures. Alternatively, FIG. 2 shows the visualization of the first embodiment in which the view is relatively close and tilted to primarily display the fronts 124 and tops 122 of the building-like structures. A user may change the viewing angle by, for example grabbing the visualization and rotating it with a pointing device, touch screen, or virtual reality interaction devices such a glove, by using keyboard commands, or by any other known or later developed input device.

Furthermore, various exemplary embodiments allow a user to access the indexed media portions by clicking on the various summaries on the building-like structures. For example, clicking on a single video frame 310 or a frame within a key frame summary 410 will play the indexed video beginning from that frame. Similarly, clicking on a slide 510 will access a larger view of the indexed slide or an indexed group of slides. Clicking on a text summary 610 will access the document or documents that the text summary 610 represents.

Figure 9:
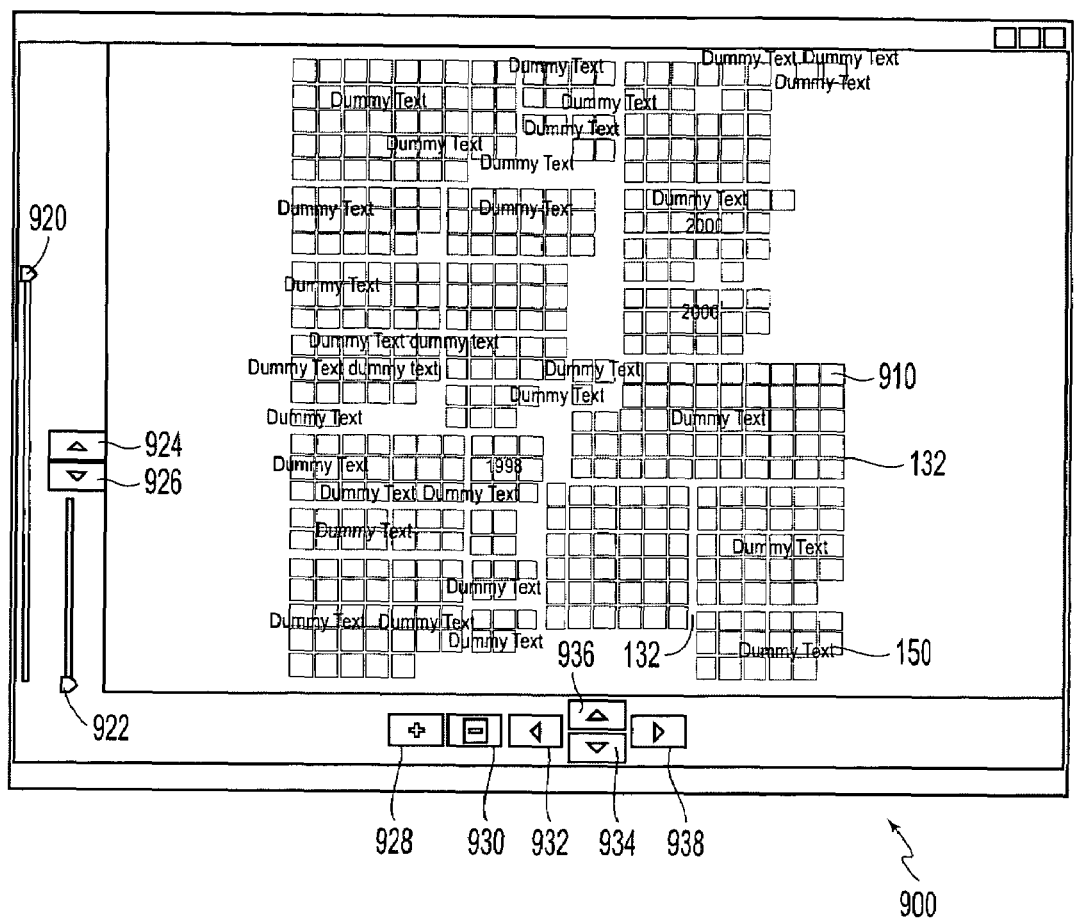
FIG. 9 shows a graphical user interface for use with the 3D visualizations of FIGS. 1-6.
Figure 10:
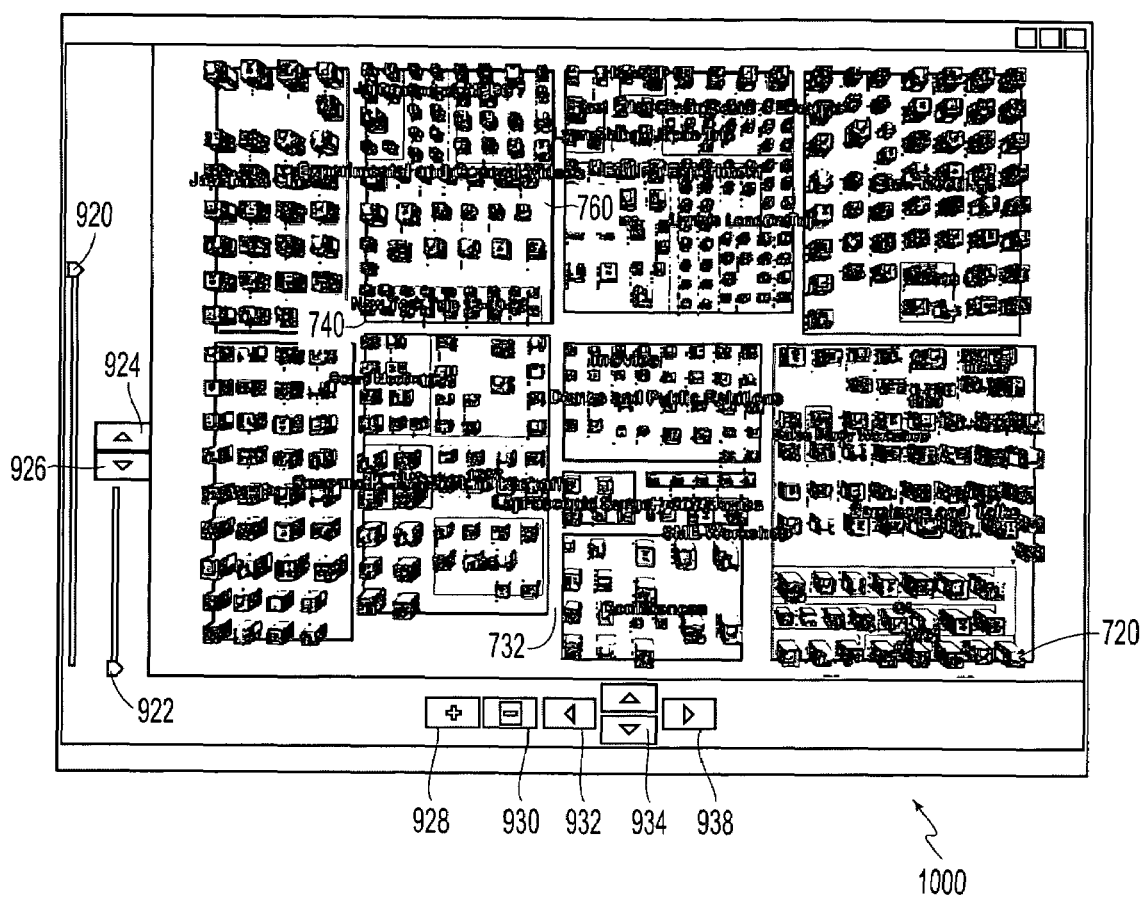
FIG. 10 shows a graphical user interface for use with the 3D visualization of FIGS. 7 and 8.

Alternatively, as shown in FIGS. 9 and 10, various exemplary embodiments of the invention provide graphical user interfaces 900, 1000 including a number of slides 920 and 922 and buttons 924, 926, 928, 930, 932, 934, 936, and 938 that enable a user to navigate and interact with the visualization. FIG. 9 shows one exemplary embodiment of a graphical user interface for use with the 3D visualization of FIGS. 1-6. FIG. 10 shows one exemplary embodiment of a graphical user interface for use with the 3D visualization of FIGS. 7 and 8. In FIGS. 9 and 10, buttons 936, 934, 932, 938 move the viewpoint forward, backward, left, and right, respectively. Buttons 928 and 930 zoom the viewpoint in and out. Buttons 924 and 926 move the viewpoint up and down (in altitude). Slider 922 tilts the view. Slider 920 is a controller does several operations together; it changes altitude and tilts the view, such that the point at center of the screen is kept fixed. As such, slider 922 enables the user to see the rooftop when high up, to see the front of the building when near the ground, and to maintain the building in the center of the screen in view.

Figure 11:
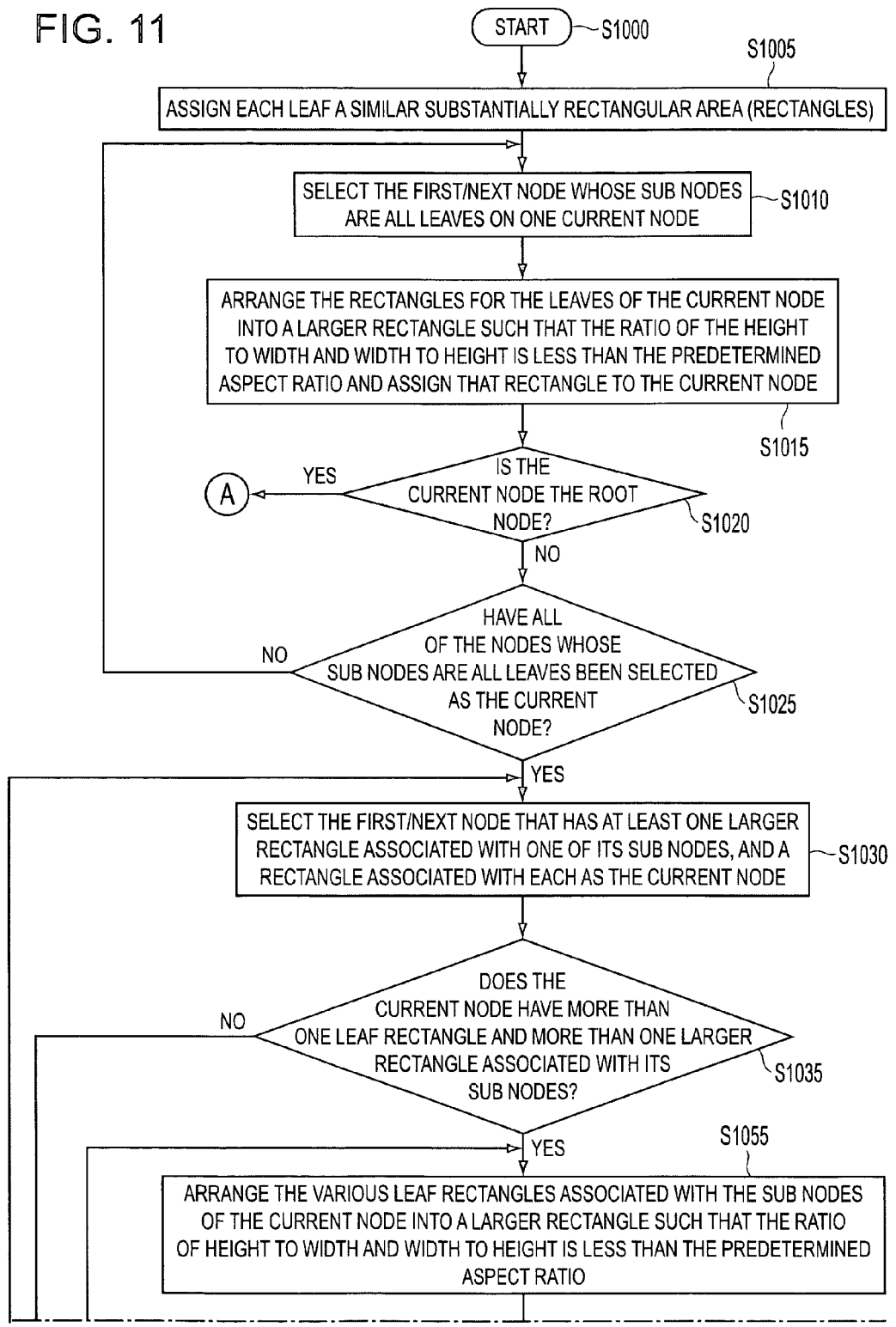
FIGS. 11 and 12 are a flowchart outlining an exemplary embodiment of a grid layout method for the type of 3D visualizations shown in FIGS. 1-6.
Figure 12:
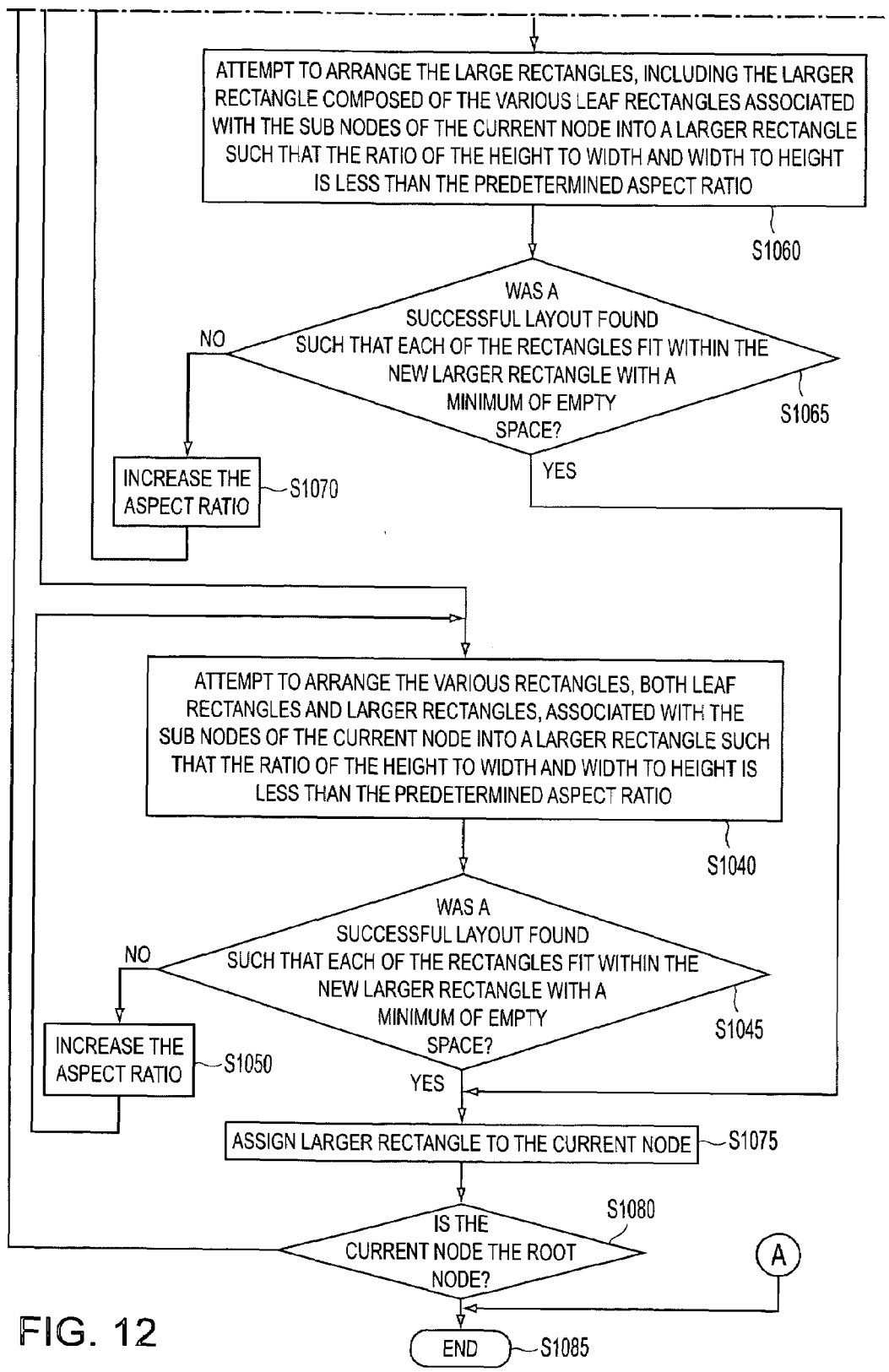

FIGS. 11 and 12 show a flowchart outlining an exemplary embodiment of a grid layout method for the above-described type of 3D visualization that utilizes substantially square and similarly sized building-like structure plots according to this invention. As discussed above, the data to be visualized is organized as tree of elements where each branch in the tree is represented by a relatively square rectangle and all of the elements within this rectangle are part of that branch of the tree. This exemplary embodiment of a layout method balances the desire to minimize blank space in the layout with the need for a relatively square layout to match the shape of the majority of output devices, e.g., a computer monitor, a printer, or the like. A single line layout would produce no blank space but would not be an efficient use of output device real estate.

As shown in FIGS. 11 and 12, operation of the method begins in step S1000 and continues to step S1005 where each leaf of the tree is assigned a similar substantially rectangular area. Then, in step S1010, a first/next node whose subnodes are all leaves is selected as the current node. Next, in step S1015, the leaves of the current node are arranged into a larger rectangle such that the ratio of the height to width and the ratio of the width to height is less than a predetermined aspect ratio and that larger rectangle is assigned to the current node. The predetermined aspect ratio is used to insure that the resulting rectangle is relatively square. This prevents the creation of rectangles that are long and thin. Operation of the method continues to step S1020.

In step S1020, a determination is made whether the current node is the root node of the tree. If the current node is the root node, all of the leaves of the tree have been arranged within a rectangle and operation jumps to step S1085 where the operation of the method ends. However, if the current node is not the root node, operation continues to step S1025.

In step S1025, a determination is made whether all of the nodes whose subnodes are all leaves have been selected as the current node. If all of the nodes whose subnodes are all leaves have not been selected as the current node, operation returns to step S1010. However, if all of the nodes whose subnodes are all leaves have been selected as the current node, operation continues to step S1030.

Figure 13:
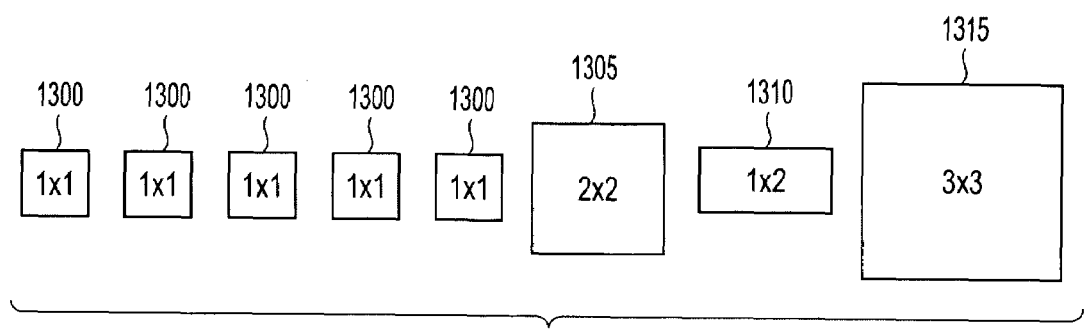
FIG. 13 shows an example of leaf nodes layouts and branch nodes layouts.

In step S1030, a first/next node that has at least one larger rectangle associated with one of its subnodes and a rectangle associated with each subnode is selected as a current node. Then, in step S1035, a determination is made whether a current node has more than one leaf rectangle and more than one larger rectangle associated with its subnodes. For example, as shown in FIG. 13, there are five leaf nodes 1300 and three branch nodes (larger rectangles) 1305, 1310, 1315. If the current node does not have more than one leaf rectangle and more than one larger rectangle associated with its subnodes, operation continues to step S1040. However, if the current node has more than one leaf rectangle and more than one larger rectangle associated with its subnodes, operation jumps to step S1055.

In step S1040, the various rectangles, both leaf rectangles and larger rectangles, associated with the subnodes of the current node are arranged into larger rectangles such that the ratio of the height to width and the ratio of the width to height is less than the predetermined aspect ratio. Then, in step S1045, a determination is made whether a successful layout was found such that each of the rectangles fit within a new larger rectangle with a minimum of empty space. If a successful layout is not found, operation to continues to step S1050, where the aspect of ratio is increased. Then, operation returns to step S1040. However, if a successful layout is found, operation jumps to step S1080.

Figure 14:
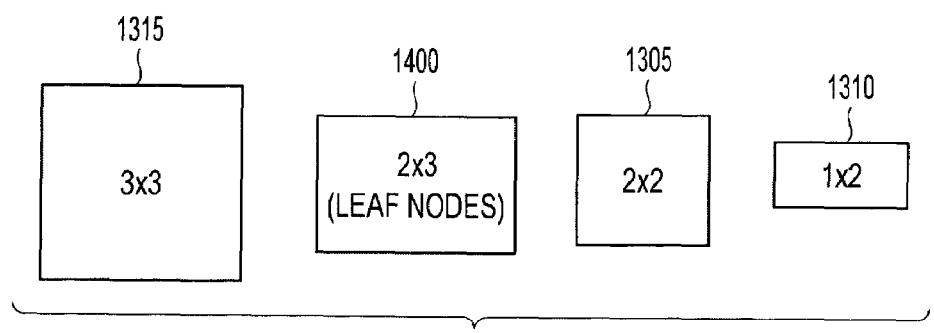
FIG. 14 shows the layouts of FIG. 13 in which the leaf node layouts are combined into a single layout.
Figure 15:
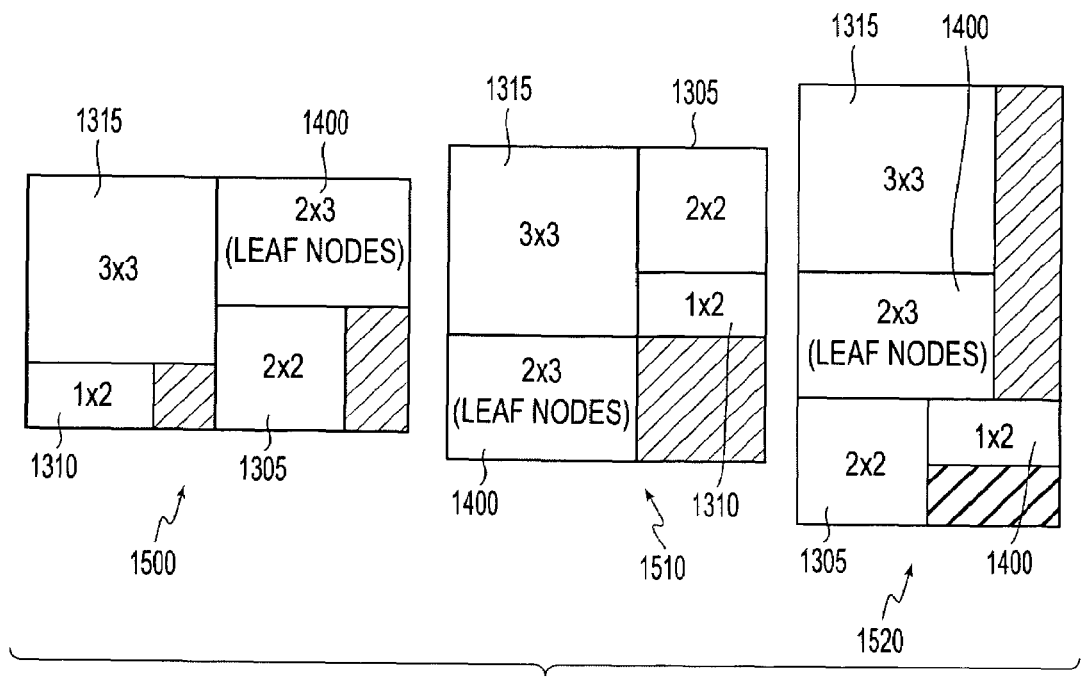
FIG. 15 shows an example of the layouts of FIG. 14 combined into larger layouts.

In step S1055, the various leaf rectangles associated with the subnodes of the current node are arranged into a larger rectangle such that the ratio of the height to width and width to height is less than the predetermined aspect ratio. For example, as shown in FIG. 14, the leaf nodes of FIG. 13 are combined into a single larger rectangle 1400. [EXPAND ON ADVANTAGE OF THIS STEP] In various exemplary embodiments, it is advantageous to group the leaf nodes into a larger rectangle because they represent media files in the same directory in the directory tree and therefore should remain close together, rather than scattered throughout the layout. Next, in step S1060, the larger rectangles, including the larger rectangle composed of the various leaf rectangles associated with the subnodes of the current node, are arranged into various larger rectangles such that the ratio of the height to width and width to height is less than the predetermined aspect ratio. For example, as shown in FIG. 15, the various rectangles 1305, 1310, 1315, 1400 are combined into a number of larger rectangles 1500, 1510, 1520. For the purpose of this example, the aspect ratio is 1.5 (the height cannot be more than 1.5 times the width and vice versa) and rectangles 1500, 1510 and 1520 show the three larger rectangles that would be considered (4×6, 5×5, and 6×4).

Then, in step S1065, a determination is made whether a successful layout was found such that each of the rectangles fit within the new larger rectangle with a minimum of empty space. As shown in FIG. 15, rectangle 1500 encloses each of the smaller rectangles 1305, 1310, 1315, 1400 with only three units of empty space. Rectangle 1510 encloses each of the smaller rectangles 1305, 1310, 1315, 1400 with four units of empty space. Rectangle 1520 cannot enclose each of the smaller rectangles 1305, 1310, 1315, 1400. It should be appreciated that, in various exemplary embodiments, when the rectangles have the same amount of empty space, preference is given to the rectangle with the smallest circumference. Returning to FIGS. 11 and 12, if a successful layout was not found, operation continues to step S1070, where the aspect ratio is increased. Then, operation returns to step S1055. However, if a successful layout was found, operation continues to step S1080.

In step S1080, the successful layout is assigned to the current node. Then, in step S1085, a determination is made whether the current node is the root node. If the current node is the root node, operation continues to step S1090 where the method ends. However, if the current node is not the root node, operation returns to step S1030 where the next node that has at least one larger rectangle associated with one of its subnodes and a rectangle associated with each subnode is selected as the current node. Operation of the flowchart will continue until, in step S1085, the current node is the root node.

Figure 16:
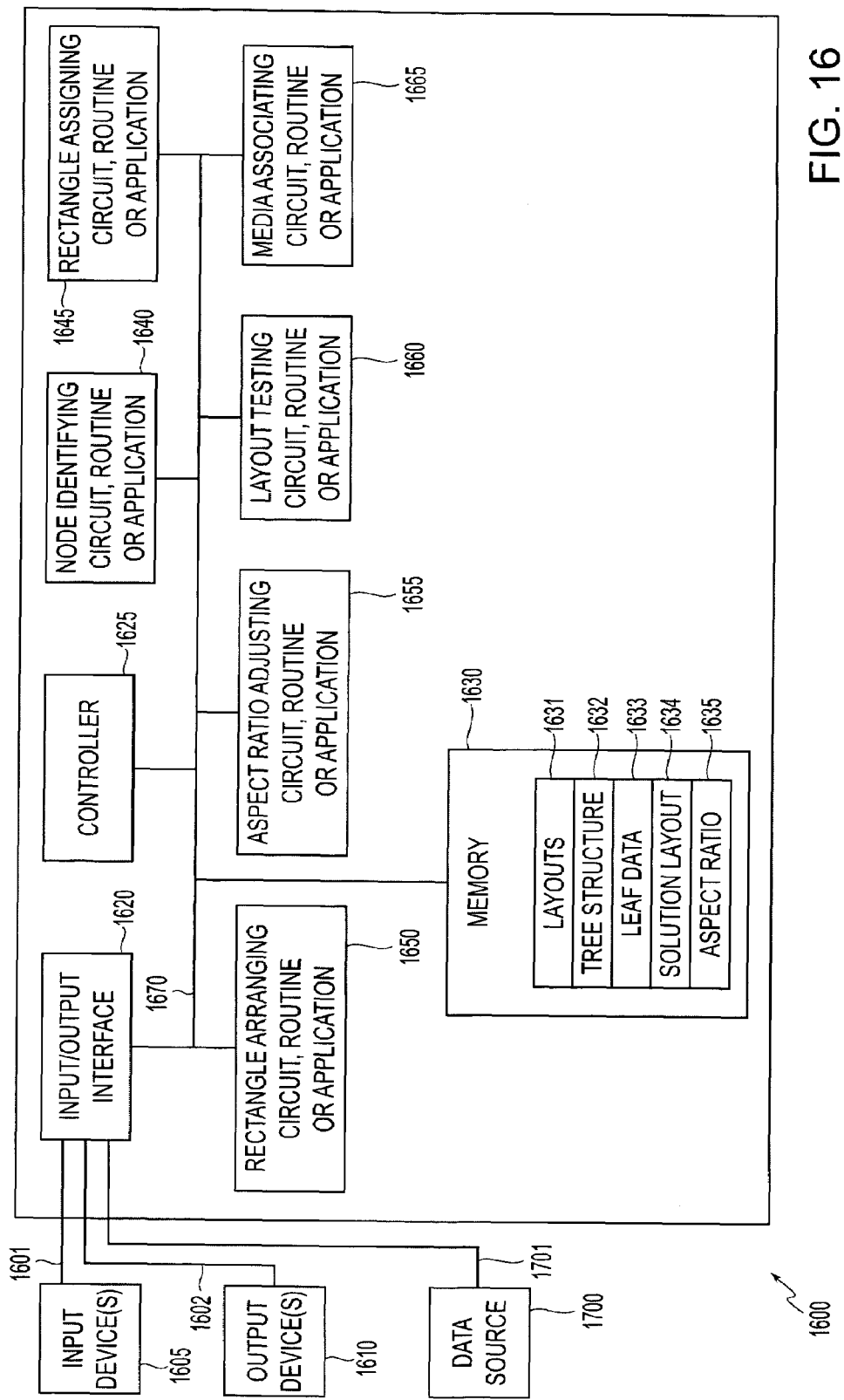
FIG. 16 shows an exemplary embodiment of a functional block diagram of a 3D visualization system.

FIG. 16 is an exemplary embodiment of a functional block diagram of an exemplary embodiment of a 3D visualization system 1600 that is usable to create 3D visualizations according to the invention. As shown in FIG. 16, the 3D visualization system 1600 includes an input/output interface 1620, a controller 1625, a memory 1630, a node identifying circuit, routine, or application 1640, a rectangle reassigning circuit, routine, or application 1645, a rectangle arranging circuit, routine, or application 1650, an aspect ratio adjusting circuit, routine, or application 1655, a layout testing comparing circuit, routine, or application 1660, and a media associating circuit, routine, or application 1665, each appropriately interconnected by one or more data/control busses and/or application programming interfaces 1670, or the like.

In this exemplary embodiment, the input/output interface 1620 is connected to one or more input devices 1605 over one or more links 1601. The input device(s) 1605 can be one or more of a keyboard, a mouse, a track ball, a track pad, a touch screen, a virtual reality glove, or any other known or later-developed device for inputting data and/or control signals to the 3D visualization system 1600. Furthermore, in this exemplary embodiment, the input/output interface 1620 is connected to one or more output devices 1610 over one or more links 1602. The output device(s) 1610 can be one or more of a computer monitor, cathode ray tube, liquid crystal display, image projector, electrophoretic display, a virtual reality display device, or any other known or later-developed device for visually displaying 3D visualization data output from the 3D visualization system 1600.

In this exemplary embodiment, the input/output interface 1620 is connected to a data source 1700 over a link 1701. The data source 1700 can be a locally or remotely located laptop or personal computer, a personal digital assistant, a tablet computer, a device that stores and/or transmits electronic data, such as a client or a server of a wired or wireless network, such as for example, an intranet, an extranet, a local area network, a wide area network, a storage area network, the Internet (especially the World Wide Web), and the like. In general, the data source 1700 can be any known or later-developed source that is capable of providing a media data organized in a tree to the input/output interface 1620.

Each of the various links 1601, 1602, and 1701 can be any known or later-developed device or system for connecting the input device(s) 1605, the output device(s) 1601, and/or the data source 1700, respectively, to the input/output interface 1620. In particular, the links 1601, 1602, and 1701 can each be implemented as one or more of a direct cable connection, a connection over a wide area network, a local area network or a storage area network, a connection over an intranet, a connection over an extranet, a connection over the Internet, a connection over any other distributed processing network or system, and/or an infrared, radio-frequency or other wireless connection.

As shown in FIG. 16, the memory 1630 contains a number of different memory portions, including a layouts portion 1631, a tree structure portion 1632, a leaf data portion 1633, a solution layout portion 1634, and an aspect ratio portion 1235. The layouts portion 1631 of the memory 1630 stores various layouts. The tree structure portion 1632 of the memory 1630 stores the tree structure of the data that will be represented in the 3D visualization. The leaf data portion 1633 of the memory 1630 stores the media represented by each leaf in the tree structure. The solution layout portion 1634 stores the solution layout that will be used in the 3D visualization. The aspect ratio portion 1235 stores the aspect ratio used to determine the various layouts.

The memory 1630 shown in FIG. 16 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like.

The node identifying circuit, routine, or application 1640 accesses the tree structure data and determines the characteristics of a node. The rectangle assigning circuit, routine, or application 1645 assigns rectangular layouts to leaf nodes. The rectangle arranging circuit, routine, or application 1650 arranges rectangular layouts into various larger rectangular layouts, based on the aspect ratio. The aspect ratio adjusting circuit, routine, or application 1655 adjusts the aspect ratio. The layout testing circuit, routine, or application 1660 tests various layouts to based on the amount of empty space. Finally, the media associating circuit, routine, or application 1665 associates the leaf data with the solution layout to create the 3D visualization.

In operation, the exemplary embodiment of the 3D visualization system 1600 shown in FIG. 16 operates in the following manner. Under control of the controller 1625, the data necessary for creating the 3D visualization is input form the data source 1700 across the link 1701 via the input/output interface 1620 and stored in the tree structure and leaf data portions 1632, 1633 of the memory 1630. Next, under control of the controller 1625, the node identifying circuit, routine, or application 1640 accesses the tree structure data in the tree structure portion 1632 of the memory 1630 and identifies each of the leaf nodes. Then, under control of the controller 1625, the rectangle assigning circuit, routine, or application 1645, accesses the identified leaf nodes and assigns each leaf node a similar substantially rectangular area. The rectangles for each leaf node, under control of the controller 1625, are associated with their respective leaf node and stored in the layouts portion 1631 of the memory 1630.

Under control of the controller 1625, the node identifying circuit, routine, or application 1640 accesses the tree structure data stored in the tree structure portion 1632 and the layout data in the layout data portion 1631 and identifies each node whose subnodes are all leaves. Then, under control of the controller 1625, the rectangle arranging circuit, routine, or application 1650 accesses the identified subnodes and arranges the rectangles assigned to the leaf nodes of each identified node into a larger rectangle. The rectangles for the identified nodes, under control of the controller 1625, are associated with their respective identified nodes and stored in the layouts portion 1631 of the memory 1630.

Under control of the controller 1625, the node identifying circuit, routine, or application 1650 accesses the tree structure data stored in the tree structure portion 1632 and the layout data in the layout data portion 1631 and identifies each node that has at least one rectangle associated with each subnode, at least one of the rectangles being larger than a leaf rectangle. Of these identified nodes, under control of the controller 1625, the node identifying circuit, routine, or application 1640, further identifies a first subgroup of the identified nodes that have more than one leaf rectangle associated with its subnodes, and more than one rectangle larger than a leaf rectangle associate with its subnodes.

Under control of the controller 1625, the rectangle arranging circuit, routine, or application 150 accesses the first subgroup of the identified nodes, and for each node, arranges the various leaf rectangles associated with the subnodes of that node into a larger rectangle with the smallest circumference. Then, under control of the controller 1625, the rectangle arranging circuit, routine, or application 1650, for each node of the of the first subgroup of identified nodes, arranges the larger rectangles of the subnodes of that node into rectangles whose height/width or width/height is less than the aspect ratio stored in the aspect ratio portion 1635 of the memory 1630. When, for a particular node, the larger rectangles of the subnodes of that node will not fit into any rectangle according to the aspect ratio, the aspect ratio adjusting circuit, routine, or application 1655 accesses the aspect ratio in the aspect ratio portion 1635 and increases the aspect ratio for that node until the larger rectangles of the subnodes of that node will fit into at least one rectangle with the smallest aspect ratio.

Then, under control of the controller 1625, the layout testing circuit, routine, or application 1660 accesses the various rectangles for each node of the first subgroup of identified nodes and selects the rectangle for each node which has the least amount of empty space. If more than one rectangle for a node of the first subgroup of identified nodes has the same amount of empty space, the layout testing circuit, routine, or application 1660 will select the rectangle with the smallest circumference (i.e., closest to square). Under control of the controller 1625, the selected rectangle for each node of the first subgroup of identified nodes is associated with its respective node and stored in the layouts portion 1631 of the memory 1630.

Once a rectangle has been stored in the layouts portion 1631 for each node of the first subgroup of identified nodes, the rectangle arranging circuit, routine, or application 1650 accesses the remaining nodes of the identified nodes as the second subgroup of identified nodes (i.e., having a rectangle associated with each subnode and a rectangle larger than a leaf rectangle associated with at least one subnode, but not included in the first subgroup of identified nodes). Then, under control of the controller 1625, the rectangle arranging circuit, routine, or application 1650, for each node of the of the second subgroup of identified nodes, arranges the larger rectangles of the subnodes of that node into a rectangles whose height/width or width/height is less than the aspect ratio stored in the aspect ratio portion 1635 of the memory 1630. When, for a particular node, the larger rectangles of the subnodes of that node will not fit into any rectangle according to the aspect ratio, the aspect ratio adjusting circuit, routine, or application 1655 accesses the aspect ratio in the aspect ratio portion 1635 and increases the aspect ratio for that node until the rectangles of the subnodes of that node will fit into at least one rectangle.

Then, under control of the controller 1625, the layout testing circuit, routine, or application 1660 accesses the various rectangles for each node of the second subgroup of identified nodes and selects the rectangle for each node which has the least amount of empty space. If more than one rectangle for a node of the second subgroup of identified nodes has the same amount of empty space, the layout testing circuit, routine, or application 1660 selects the rectangle with the smallest circumference (i.e., closest to square). Under control of the controller 1625, the selected rectangle for each node of the second subgroup of identified nodes is associated with its respective node and stored in the layouts portion 1631 of the memory 1630.

Once a rectangle has been selected and stored in the layouts portion 1631 for each node of the identified nodes (i.e., both the first and second subgroups), under control of the controller 1625, the node identifying circuit, routine, or application 1640 again accesses the tree structure data stored in the tree structure portion 1632 and the layout data in the layout data portion 1631 and identifies each node that now has at least one rectangle associated with each subnode, at least one of the rectangles being larger than a leaf rectangle. These nodes become the new set of identified nodes, and the data flow continues as above. However, when at any time during the operation of the 3D visualization system 1600, under control of the controller 1625, the node identifying circuit, routine, or application accesses the tree structure data stored in the tree structure portion 1632 and the layout data in the layout data portion 1631 and determines that there is only a single layout associated with a single node, the solution layout has been determined (all layouts have been combined until the root node is associated with the only rectangle).

Then, under control of the controller 1625, the single layout for the root node is stored in the solution layout portion 1634 of the memory 1630. Next, under control of the controller 1625, the media associating circuit, routine, or application 1665 accesses the solution layout in the solution layout portion 1634 and the media data in the leaf data portion 1633, and associates the media data for each leaf with that leaf's location according to the solution layout. At this point the 3D visualization has been created and, under control of the controller 1625, is ready to be output to the output device(s) 1610 across link 1602 via the input output interface.

It should be appreciated that, depending on cost or other design constraints, one or more of the above-described elements of the 3D visualization system 1200 may be combined into a single element or divided into multiple elements where appropriate.

FIGS. 17-21 are flowcharts outlining an exemplary embodiment of a method for determining layout for the above-described 3D visualization, exemplified in FIGS. 7 and 8, wherein each leaf node is assigned a different size parcel that reflects an attribute of that leaf node.

Figure 17:
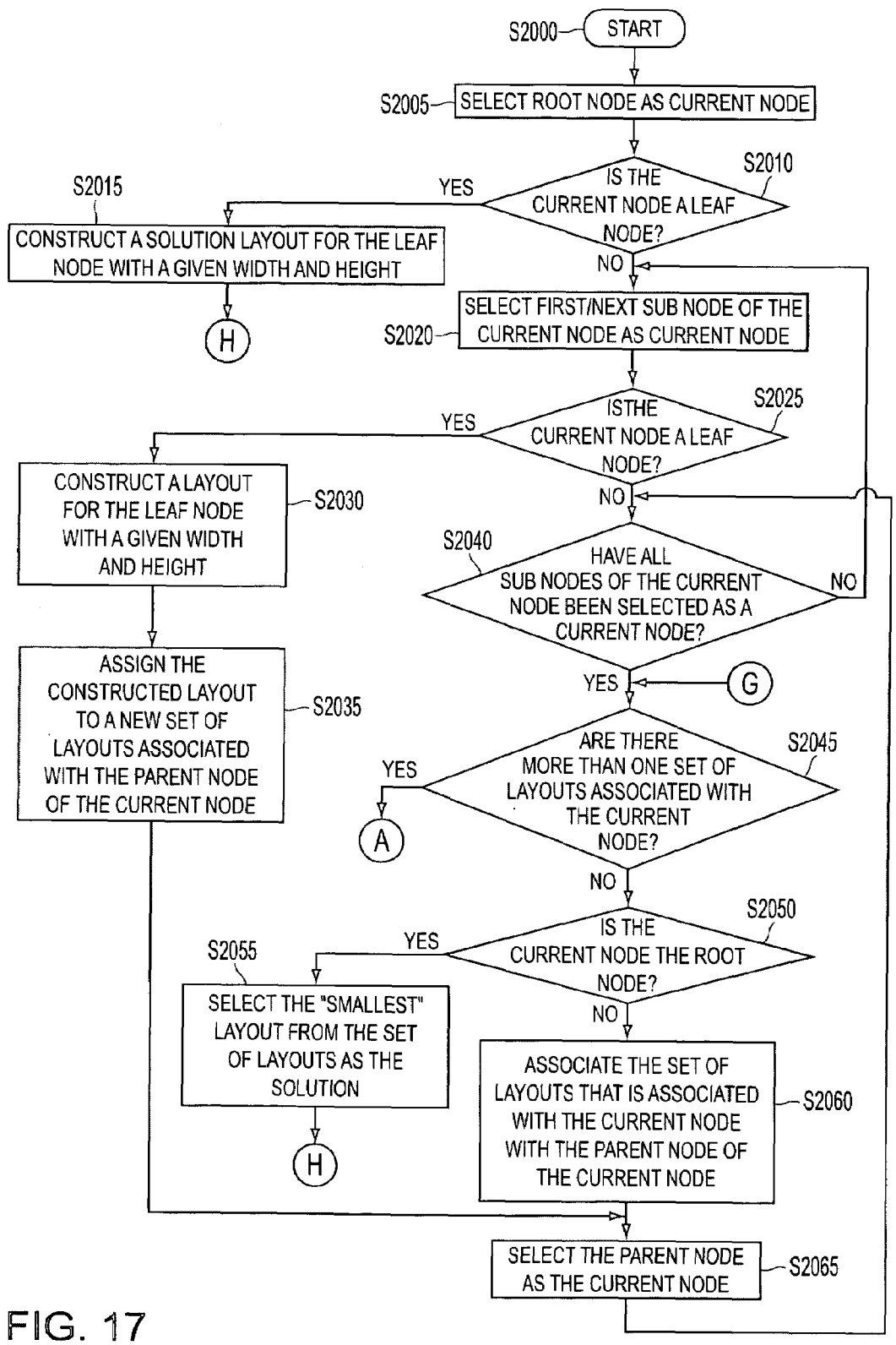
FIGS. 17-21 are a flowchart outlining an embodiment of a method for determining layout for the type of 3D visualizations shown in FIGS. 7 and 8.
Figure 18:
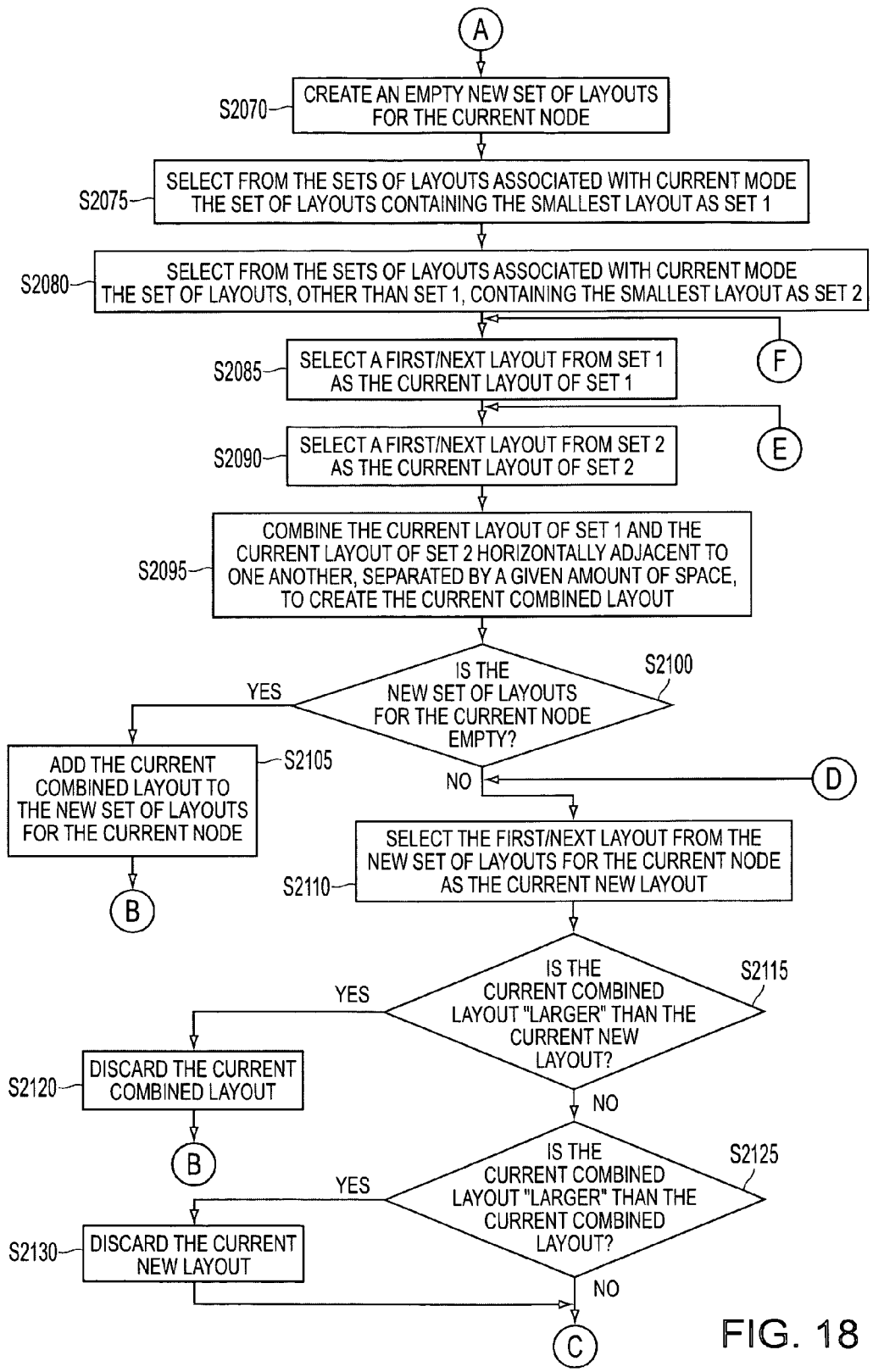
Figure 19:
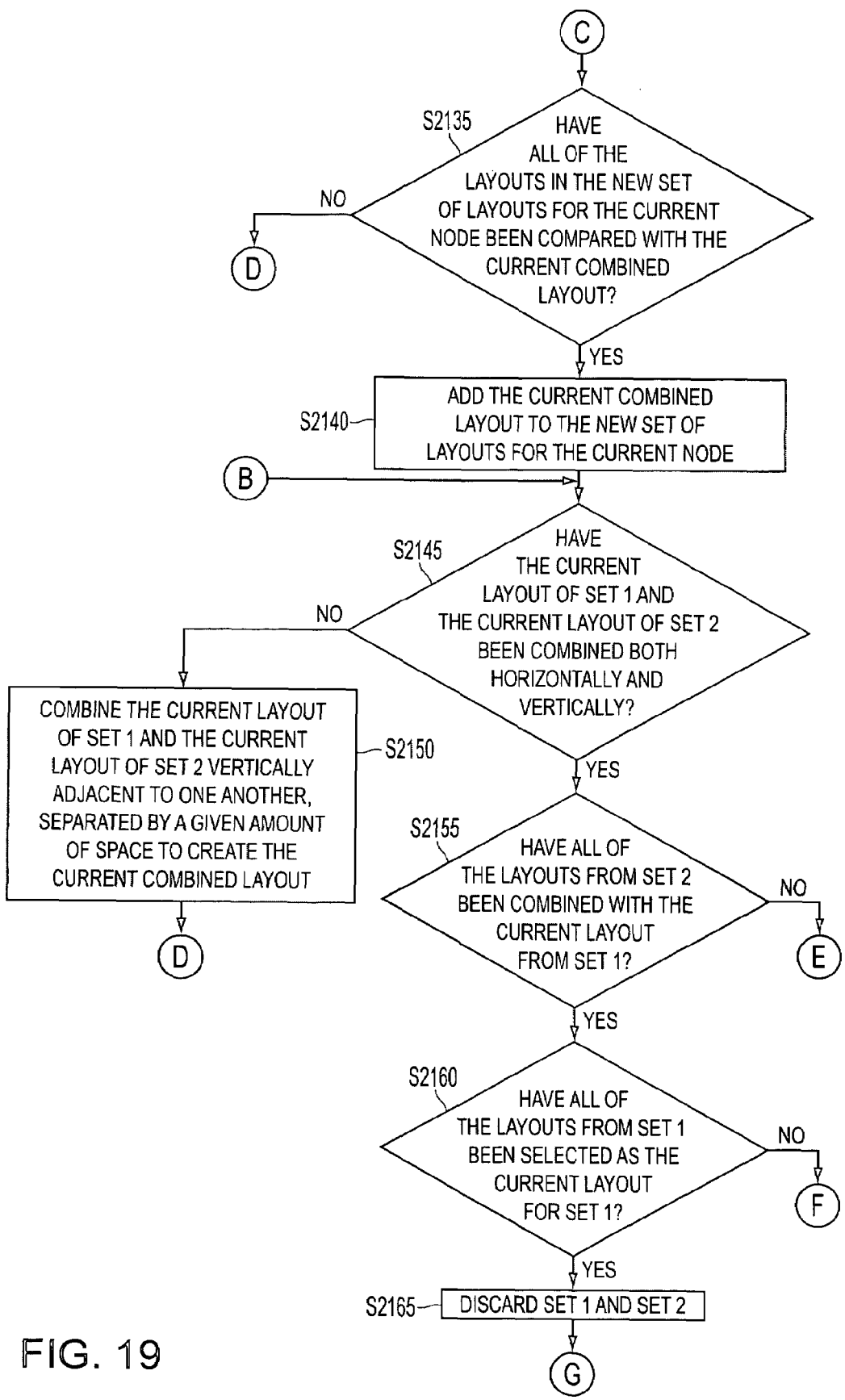
Figure 20:
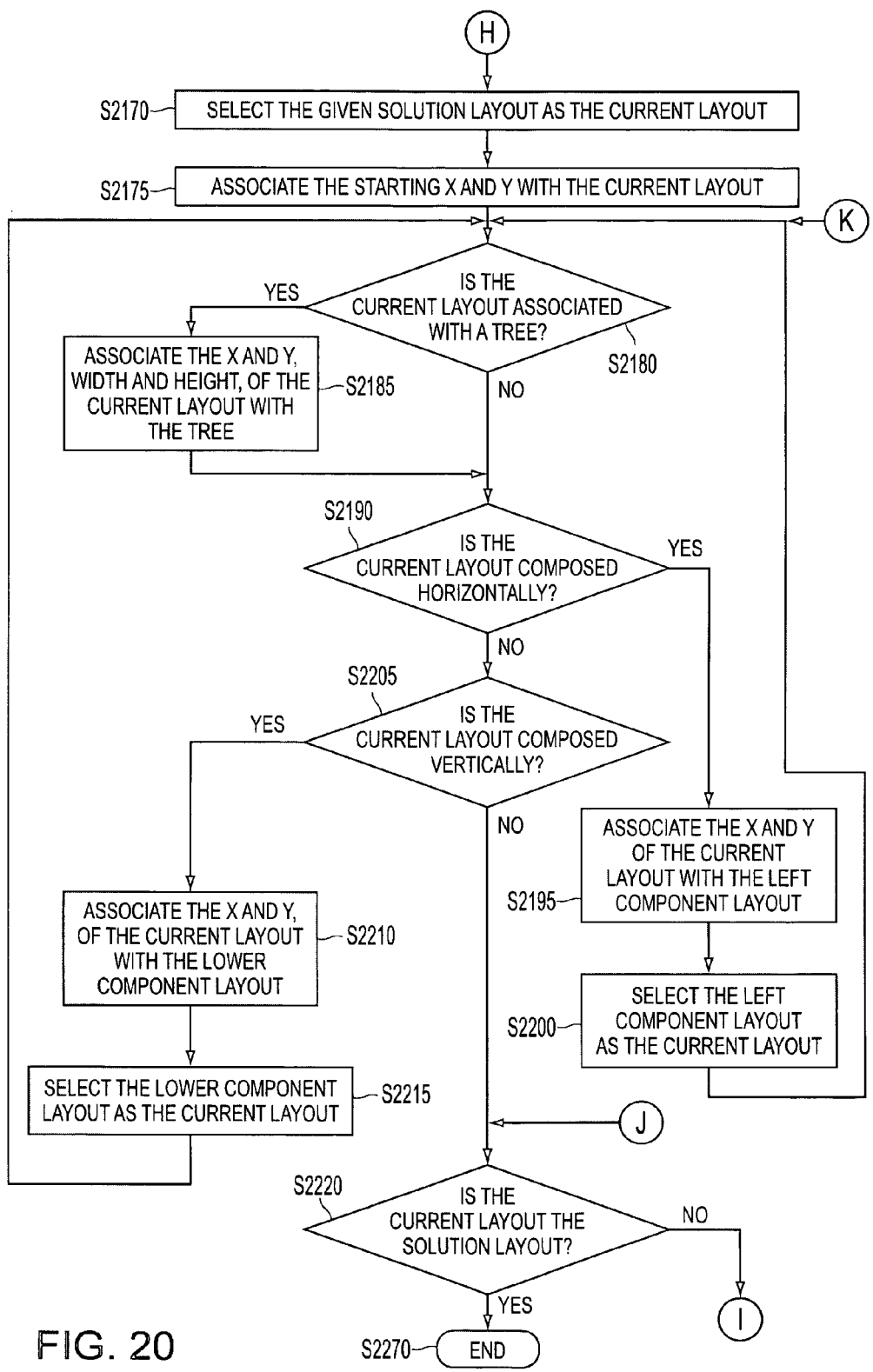
Figure 21:
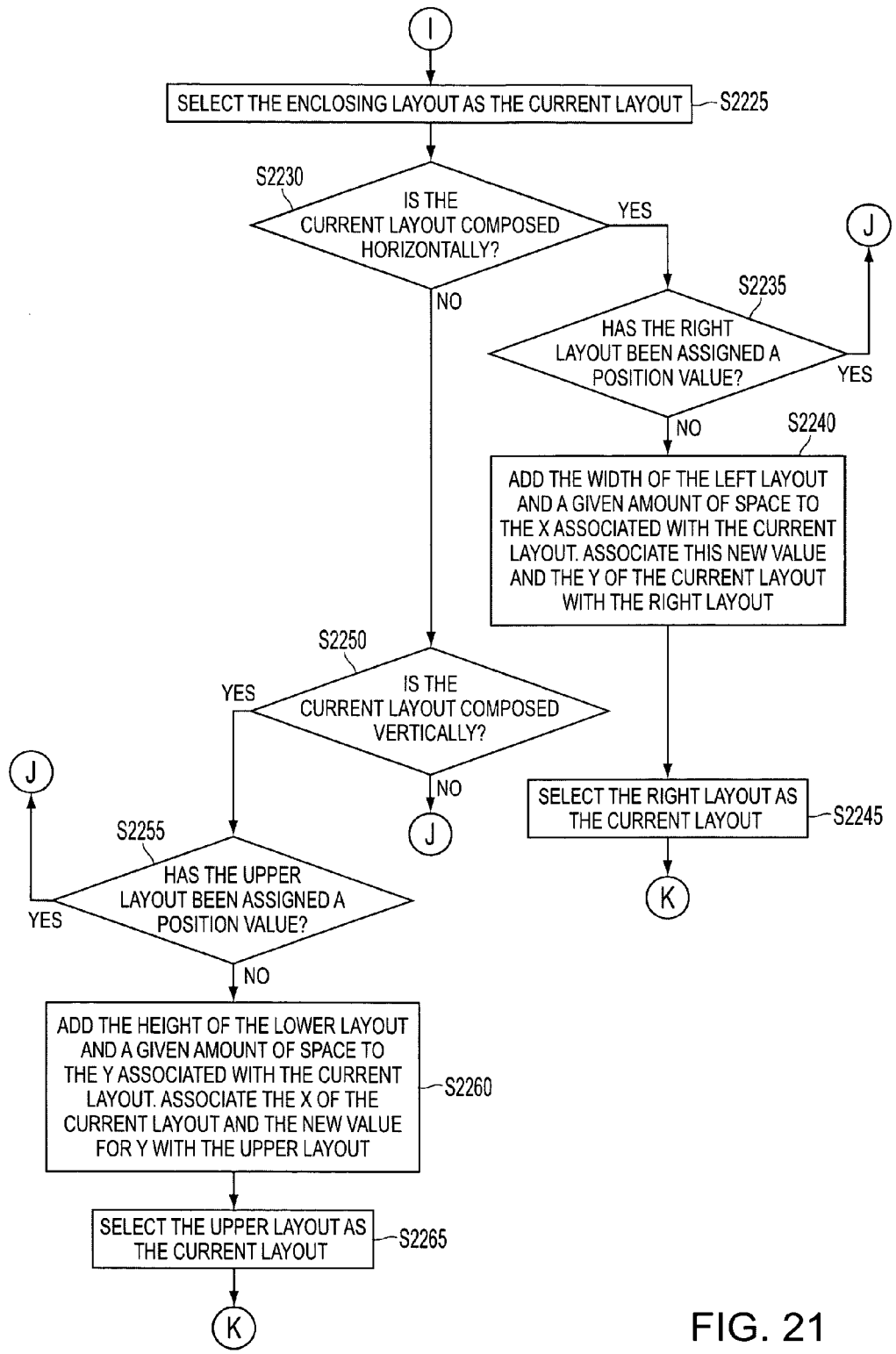

As shown in FIG. 17, operation of the method begins in step S2000 and continues to step S2005 where the root node is selected as the current node. Then, operation continues to step S2010, where a determination is made whether the current node is a leaf node. If the current node is a leaf node, operation continues to step S2015, where a solution layout for the leaf node is constructed with a given width and height. Then, operation continues to step S2170. However, if the current node is not a leaf node, operation continues to step S2020 where the first or next subnode of the current node is selected as the current node. Operation continues to step S2025.

In step S2025, a determination is made whether the current node is a leaf node. If the current node is a leaf node, operation continues to step S2030 where a layout is constructed for the leaf node with a given width and height. Otherwise, operation jumps to step S2040. Next, in step S2035, the constructed layout is assigned to a new set of layouts associated with the parent node of the current node.

Then, operation jumps to step S2065.

In step S2040, a determination is made whether all the subnodes of the current node have been selected as a current node. If all subnodes of the current node have not been selected as a current node, operation returns to step S2020. If all subnodes of the current node have been selected as a current node, operation continues to step S2045. In step S2045, a determination is made whether more than one set of layouts is associated with the current node. If there is more than one set of layouts associated with the current node, operation jumps to step S2070. If there is not more than one set of layouts associated with the current node, operation continues to step S2050.

In step S2050, a determination is made whether the current node is the root node. If the current node is the root node, operation continues to step S2055. If the current node is not the root node, operation jumps to step S2060.

In step S2055, the "smallest" layout is selected from the set of layouts as the solution. In various exemplary embodiments, the "smallest" layout is determined to be the layout with the smallest circumference. As such, the "smallest" layout may not have the smallest overall area, but will have a small area and be the closest to square. Operation then continues to step S2170.

In step S2060, the set of layouts that is associated with the current node is associated with the parent node of the current node. Then, operation continues to step S2065, where the parent node is selected as the current node. Next, operation returns to step S2040, where it is once again determined whether all of the subnodes the current node have been selected as a current node.

In step S2070, an empty new set of layouts is created for the current node. Next, in step S2075, a set of layouts containing the smallest layout is selected from the sets of layouts associated with the current node as set 1. Then, in step S2080, a set of layouts, other than set 1, containing the smallest layout is selected from the sets of layouts associated with the current node as set 2. Next, step S2085, a first or next layout is selected from set 1 as the current layout of set 1. Then, in step S2090, a first or next layout is selected from set 2 as the current layout of set 2. Operation continues to step S2095.

In step S2095 the current layout of set 1 and the current layout of set 2 are combined horizontally adjacent to one another, separated by a given amount of space, to create the current combined layout. Next, in step S2100, determination is made whether the new set of layouts for the current node is empty. If the new set of layouts for the current node is empty, operation continues to step S2105 where the current combined layout is added to the new set of layouts for the current node. Then, operation jumps to step S2145. However, if the new set of layouts for the current node is not empty, operation continues to step S2110.

In step S2110, a first or next layout from the new set of layouts for the current node is selected as the current new layout. Then, operation continues to step S2115, where it is determined whether the current combined layout is "larger" than the current new layout. According to various exemplary embodiments of this method, "larger" means that one layout has both a larger width and a larger height than another layout. If the current combined layout is larger than the current new layout, operation continues to step S2120 where the current combined layout is discarded. Then, operation jumps to step S2145. However, if the current combined layout is not larger than the current new layout, operation continues to step S2125.

In step S2125, it is determined whether the current new layout is "larger" than the current combined layout. If the current new layout is larger than the current combined layout, operation continues to step S2130 where the current new layout is discarded. Operation then continues to step S2135. However, if the current new layout is not larger than the current combined layout, operation jumps to step S2135. It should be appreciated that it is possible for the current combined layout to not be larger than the current new layout and the current new layout not be larger than the current combined layout since in order to be larger both the height and the width of one of the layouts must be respectively larger than the height and the width of the other layout.

In step S2135, a determination is made whether all of the layouts in the new set of layouts for the current node have been compared with the current combined layout. If not, operation returns to step S2110. However, if all of the layouts of the new set of layouts for the current node have been compared with the current combined layout, operation continues to step S2140 where the current combined layout is added to the new set of layouts for the current node. Then, operation continues to step S2145.

In step S2145, it is determined whether the current layout of set 1 and the current layout of set 2 have been combined both horizontally and vertically. If not, operation continues to step S2150, where the current layout of set 1 and the current layout of set 2 are combined vertically adjacent to one another, separated by a given amount of space, to create the current combined layout. Operation then returns to step S2110. However, if the current layout of set 1 and the current layout of set 2 have been combined both horizontally and vertically, operation continues to step S2155.

In step S2155, it is determined whether all of the layouts from set 2 have been combined with the current layout from set 1. If not, operation returns to step S2090 where the next layout from set 2 is selected as the current layout of set 2. If all of the layouts from set 2 have been combined with the current layout from set 1, operation continues to step S2160. In step S2160, it is determined whether all the layouts from set 1 have been selected as the current layout for set 1. If not, operation returns to step S2085 where the next layout from set 1 is selected as the current layout of set 1. However, if all of the layouts from set 1 have been selected as the current layout for set 1, operation continues to step S2165.

In step S2165, set 1 and set 2 are discarded, and therefore, are no longer associated with the current node. Then, operation returns to step S2045, where a determination is made whether there are more than on one set of layouts associated with the current node, and the operation of the flowchart continues as above.

In steps S2015 and S2055, once a solution layout has been determined, operation continues to step S2170. In step S2170, the solution layout is selected as the current layout. Next, in step S2175, a starting x and y are associated with the current layout. Then, in step S2180, it is determined whether the current layout is associated with a tree. If the current layout is associated with a tree, operation continues to step S2185, where the x, y, width, and height of the current layout are associated with the tree. Operation continues to step S2190. However, if the current layout is not associated with a tree, operation jumps directly from step S2180 to step S2190.

In step S2190, it is determined whether the current layout is composed horizontally, (i.e., was the current layout created in step S2095). If the current layout is composed horizontally, operation continues to step S2195. If the current layout is not composed horizontally, operation jumps to step S2205.

In step S2195, the x and y of the current layout are associated with the left component layout, the left component layout being the layout of the left side of the horizontally combined current layout. Next, in step S2200, the left component layout is selected as the current layout. Then, operation returns to step S2180.

In step S2205, it is determined whether the current layout is composed vertically (i.e., was created during step S2150). If the current layout is composed vertically, operation continues to step S2210. If the current layout is not composed vertically, operation jumps to step S2220. In step S2210, the x and y of the current layout are associated with the lower component layout, the lower component layout being the layout on the bottom of the vertically combined current layout. Next, in step S2215, the lower component layout is selected as the current layout. Then, operation returns to step S2180.

In step S2220, a determination is made whether the current layout is the solution layout. If the current layout is the solution layout, every component layout has been assigned a location and operation jumps to step S2270, where the method ends. However, if the current layout is not the solution layout, operation continues to step S2225.

In step S2225, the enclosing layout is selected as the current layout. Then, in step S2230, it is determined whether the current layout is composed horizontally. If the current layout is not composed horizontally, operation jumps to step S2250. However, if the current layout is composed horizontally, operation continues to step S2235 where it is determined whether the right layout has been assigned a position value (i.e., whether or not an x and y is associated with the right layout). If so, operation returns to step S2220. However, if the right layout has not been assigned a position value, operation continues to step S2240. In step S2240, the width of the left layout and a given amount of space is added to the x associated with the current layout. Then, this new value and the y of the current layout are associated with the right layout. Next, operation continues to step S2245 where the right layout is selected as the current layout. Then, operation returns to step S2180.

In step S2250, a determination is made whether the current layout is composed vertically. If not, operation returns to step S2220. However, if the current layout is composed vertically, operation continues to step S2255 where it is determined whether the upper layout has been assigned a position value. If the upper layout has been assigned a position value, operation returns to step S2220. If the upper layout has not been assigned a position value, operation continues to step S2260 where the height of the lower layout and a given amount of space is added to the y associated with the current layout. Then, the x of the current layout and the new value for y is associated with the upper layout. Next, operation continues to step S2265. In step S2265, the upper layout is selected as the current layout and operation returns to step S2180. The operation of the flowchart will continue to move the various steps until, in step S2220 the current layout is the solution layout. At such time, each component layout of the solution layout has been assigned a position value and operation continues to step S2270 where operation of the method ends.

Figure 22:
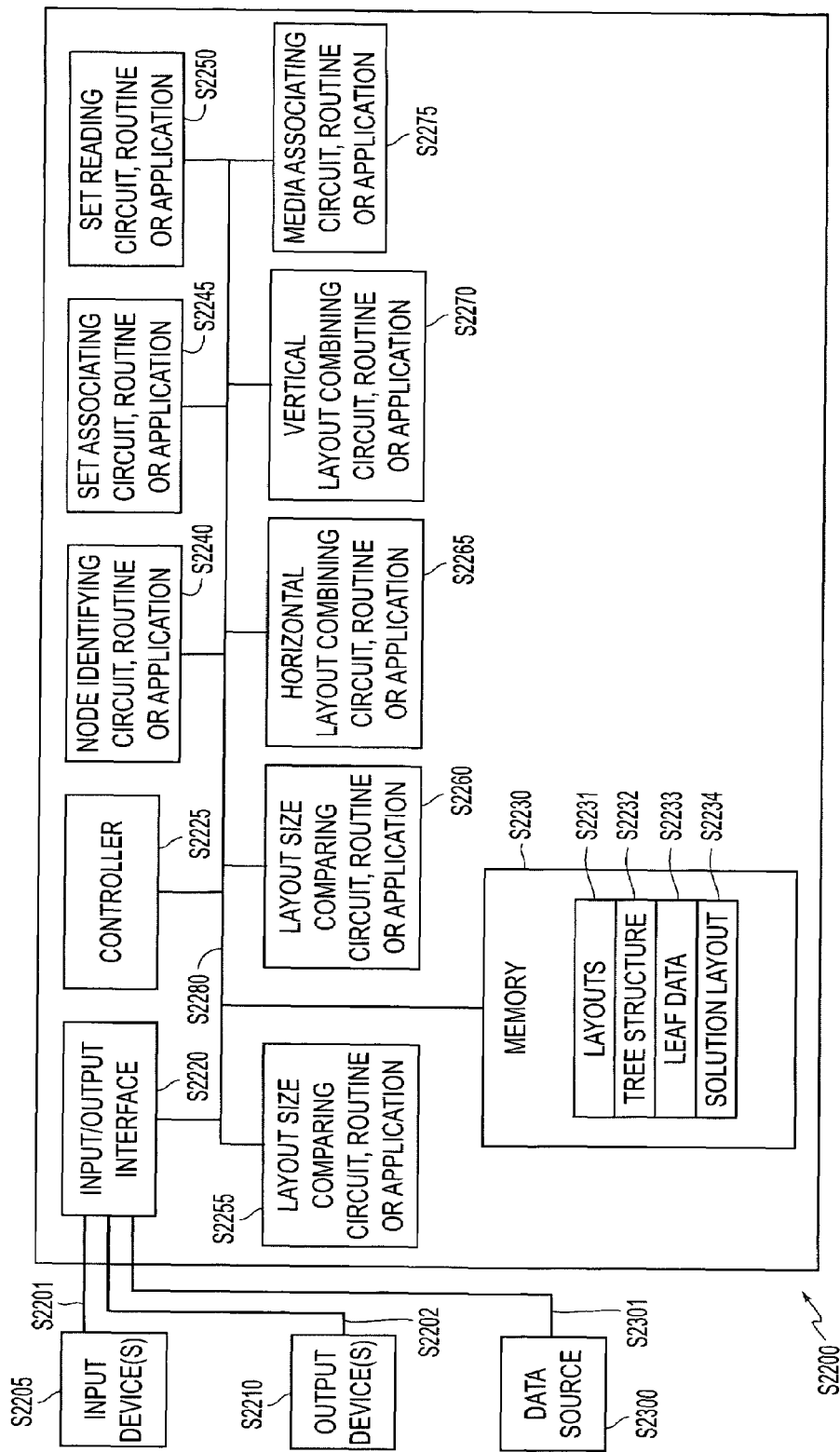
FIG. 22 shows an exemplary embodiment of a functional block diagram of a 3D visualization system.

FIG. 22 is exemplary embodiment of a functional block diagram of another exemplary embodiment of a 3D visualization system 2200 that is usable to create 3D visualizations according to the invention. As shown in FIG. 22, the 3D visualization system 2200 includes an input/output interface 2220, a controller 2225, a memory 2230, a node identifying determining circuit, routine, or application 2240, a set associating circuit, routine, or application 2245, a set creating circuit, routine, or application 2250, a layout size comparing circuit, routine, or application 2255, a layout constructing circuit, routine, or application 2260, a horizontal layout combining circuit, routine, or application 2265, a vertical layout combining circuit, routine, or application 2270, and a media associating circuit, routine, or application 2275, each appropriately interconnected by one or more data/control busses and/or application programming interfaces 2280, or the like.

In this exemplary embodiment, the input/output interface 2220 is connected to one or more input devices 2205 over one or more links 2201. The input device(s) 2205 can be one or more of a keyboard, a mouse, a track ball, a track pad, a touch screen, a virtual reality glove, or any other known or later-developed device for inputting data and/or control signals to the 3D visualization system 2200. Furthermore, in this exemplary embodiment, the input/output interface 2220 is connected to one or more output devices 2210 over one or more links 2202. The output device(s) 2210 can be one or more of a computer monitor, cathode ray tube, liquid crystal display, image projector, electrophoretic display, a virtual reality display device, or any other known or later-developed device for visually displaying 3D visualization data output from the 3D visualization system 2200.

In this exemplary embodiment, the input/output interface 2220 is connected to a data source 2300 over a link 2301. The data source 2300 can be a locally or remotely located laptop or personal computer, a personal digital assistant, a tablet computer, a device that stores and/or transmits electronic data, such as a client or a server of a wired or wireless network, such as for example, an intranet, an extranet, a local area network, a wide area network, a storage area network, the Internet (especially the World Wide Web), and the like. In general, the data source 2000 can be any known or later-developed source that is capable of providing a media data organized in a tree to the input/output interface 2220.

Each of the various links 2201, 2202, and 2301 can be any known or later-developed device or system for connecting the input device(s) 2205, the output device(s) 2201, and/or the data source 2300, respectively, to the input/output interface 2220. In particular, the links 2201, 2202, and 2001 can each be implemented as one or more of a direct cable connection, a connection over a wide area network, a local area network or a storage area network, a connection over an intranet, a connection over an extranet, a connection over the Internet, a connection over any other distributed processing network or system, and/or an infrared, radio-frequency or other wireless connection.

As shown in FIG. 22, the memory 2230 contains a number of different memory portions, including a layouts portion 2231, a tree structure portion 2232, a leaf data portion 2233, and a solution layout portion 2234. The layouts portion 2231 of the memory 2230 stores various layouts. The tree structure portion 2232 of the memory 2230 stores the tree structure of the data that will be represented in the 3D visualization. The leaf data portion 2233 of the memory 2230 stores the media represented by each leaf in the tree structure. The solution layout portion 2234 stores the solution layout that will be used in the 3D visualization.

The memory 2230 shown in FIG. 22 can be implemented using any appropriate combination of alterable, volatile or non-volatile memory or non-alterable, or fixed, memory.

The alterable memory, whether volatile or non-volatile, can be implemented using any one or more of static or dynamic RAM, a floppy disk and disk drive, a writeable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like.

The node identifying circuit, routine, or application 2240 accesses the tree structure data and determines the characteristics of a node. The rectangle assigning circuit, routine, or application 2245 assigns rectangles to leaf nodes. The set associating circuit, routine, or application 2245 associates various layouts with a set of layouts. The set creating circuit, routine, or application 2250 creates empty sets with which various layouts may be associated. The layout size comparing circuit, routine, or application 2255 compares the size various layouts. The layout constructing circuit, routine, or application 2260 creates layouts for leaf nodes. The horizontal layout combining circuit, routine, or application 2265 combines layouts horizontally into a larger layout. The vertical layout combining circuit, routine, or application 2270 combines layouts vertically into a larger layout. Finally, the media associating circuit, routine, or application 2265 associates the leaf data with the solution layout to create the 3D visualization.

In operation, the exemplary embodiment of the 3D visualization system 2200 shown in FIG. 16 operates in the following manner. Under control of the controller 2225, the data necessary for creating the 3D visualization is input from the data source 2000 across the link 2001 via the input/output interface 2220 and stored in the tree structure and leaf data portions 2232, 2233 of the memory 2230. Next, under control of the controller 2225, the node identifying circuit, routine, or application 2240 accesses the tree data stored in the tree structure portion and identifies the leaf nodes. Then, under control of the controller 2225, the layout constructing circuit, routine, or application 2260 accesses the identified leaf nodes and constructs a layout with a given width and height for each leaf node. Under control of the controller 2225, the set creating circuit, routine, or application 2250 creates an empty set of layouts for each of the identified leaf nodes. Then, under control of the controller 2225, the layouts for each leaf node are stored within the new set created for that leaf node's layout node in the layouts portion 2231 of the memory 2230 and associated with the parent node of the leaf node for which the set was created.

After a layout for each node has been created, under control of the controller 2225, the node identifying circuit, routine, or application 2240 accesses the tree structure data stored in the tree structure portion and identifies each node that only has one set associated with it. Then, under control of the controller 2225, the set associating circuit, routine, or application 2245 associates that set with the first parent node in the identified node's progeny that has more than one subnodes. Next, under control of the controller 2225, the node identifying circuit, routine, or application 2240 identifies all of the nodes that have a set of layouts associated with each of that node's subnodes.

Under control of the controller 2225, the set creating circuit, routine, or application 2250 creates a new empty set of layouts for each of the identified nodes. Then, under control of the controller 2225, for each identified node, the horizontal layout combining circuit, routine, or application 2265 selects a layout from the set of layouts containing the smallest layout (set 1). Then, for each identified node, under control of the controller 2225, the horizontal layout combining circuit, routine, or application 2265 identifies the set of layouts other than set 1 with the smallest layout (set 2). Under control of the controller 2225, the horizontal layout combining circuit, routine, or application 2265 combines each layout from set 1 with every layout from set 2 in a horizontally adjacent fashion. The first of these combined layouts is stored in the newly created empty set of layouts for each of identified nodes. Then, under control of the controller 2225, the remaining combined layouts for each identified node are accessed by the layout size comparing circuit, routine, or application 2255.

The layout size comparing circuit, routine, or application 2255, under control of the controller 2225, compares each combined layout with each of the layouts in the newly created set. If, under control of the controller 2225, the layout size comparing circuit, routine, or application 2255 determines that a combined layout is "larger" than a layout in the new set (i.e., both the height and width of the combined layout is larger than the layout in the new set), the combined layout is discarded. If, under control of the controller 2225, the layout size comparing circuit, routine, or application 2255 determines that a layout in the new set is "larger" than a combined layout, the new layout is discarded and the combined layout is stored in the new set.

Next, under control of the controller 2225, the vertical layout combining circuit, routine, or application combines each of the layouts from set 1 with every layout from set 2. Again, under control of the controller 2225, if the layout size comparing circuit, routine, or application 2255 determines that a combined layout is "larger" than a layout in the new set, the combined layout is discarded. If, under control of the controller 2225, the layout size comparing circuit, routine, or application 2255 determines that a layout in the new set is "larger" than a combined layout, the new layout is discarded and the combined layout is stored in the new set.

Once, under control of the controller 2225, each of the layouts from set 1 has been combined vertically and horizontally with all of the layouts from set 2, sets 1 and 2 are discarded. Next, the node identifying circuit, routine, or application 2240, under control of the controller 2225, accesses the tree structure data stored in the tree structure portion 2232 and the layout data stored in the layout portion 2231 and identifies each node that only has one set associated with it. Then, under control of the controller 2225, the set associating circuit, routine, or application 2245 associates that set with the first parent node in the identified node's progeny that has more than one subnodes. Next, under control of the controller 2225, the node identifying circuit, routine, or application 2240 identifies all of the nodes that have had a set of layouts associated with each of that node's subnodes.

Under control of the controller 2225, the set creating circuit, routine, or application 2250 again creates a new empty set of layouts for each of the identified nodes. In this manner, for each node, the sets of layouts associated with that node will be consolidated until one set remains and that set will be associated with the nodes parent node. The data flow repeats until, under control of the controller 2225, the node identifying circuit, routine, or application 2240 determines that the root node has only one set of layouts associated with it and all of the subnodes of the parent node no longer have any sets. At this point, under control of the controller 2225, the layout size comparing circuit, routine, or application 2255 accesses the set of layouts associated with the root node and selects the smallest layout from the set (i.e., the layout with the smallest circumference). Then, under control of the controller 2225, the smallest layout is stored in the solution layout portion 2234, of the memory 2230. Next, under control of the controller 2225, the media associating circuit, routine, or application accesses the solution layout in the solution layout portion 2234 and the media data in the leaf data portion 2233, and associates the media data for each leaf with that leaf's location according to the solution layout. At this point, the 3D visualization has been created and, under control of the controller 2225, is ready to be output to the output device(s) 2210 across link 2202 via the input output interface 2220.

It should be appreciated that, depending on cost or other design constraints, one or more of the above-described elements of the 3D visualization system 1200 may be combined into a single element or divided into multiple elements where appropriate.

According to the above-described exemplary embodiments of the systems, methods, and graphical user interfaces according to this invention, a 3D visualization of media indexed within a tree data structure is provided wherein 3D objects representing the indexed media display visual summaries of the indexed media. These summaries allow a user to visually evaluate the indexed media, based on its content, without having to access the media itself. The ability to evaluate the media based on its content is particularly advantageous when a large amount of media is indexed and it would be impractical to access each leaf of the tree data structure in order to evaluate the media.

While the invention has been described in conjunction with exemplary embodiments, these embodiments should be viewed as illustrative, not limiting. Various modifications, substitutes, or the like are possible within the spirit and scope of the invention.

What is claimed is:

1. A system for creating a 3D visualization comprising: a node identifying circuit, routine, or application that accesses a tree data structure and identifies qualities of nodes within the tree data structure; a rectangle assigning circuit, routine, or application that assigns rectangular layouts to nodes within the tree data structure; a rectangle arranging circuit, routine, or application that arranges rectangular layouts into larger candidate rectangular layouts; a layout testing circuit, routine, or application that compares candidate rectangular layouts and selects a solution layout; and a media associating circuit, routine, or application that associates media with the solution layout to create a 3D visualization, wherein, if there are two candidate layouts with the least amount of empty space, the layout testing circuit, routine, or application selects the candidate layout with the smallest circumference as the solution layout for that node.

2. The system of claim 1, wherein:
the node identifying circuit, routine, or application accesses a tree data structure and identifies each leaf with the tree data structure; and
the rectangle assigning circuit, routine, or application assigns each identified leaf a rectangular layout.

3. The system of claim 2, wherein:
the node identifying circuit, routine, or application identifies each node whose subnodes are all leaves; and
the rectangle arranging circuit, routine, for each identified node whose subnodes are all leaves, arranges the rectangular layouts of the subnodes of that identified node into a larger rectangular layout and assigns the larger rectangular layout to that identified node.

4. The system of claim 3, wherein:
the node identifying circuit, routine, or application identifies each node that has a rectangular layout for each subnode, more than one of the rectangular layouts for each node being larger than a leaf rectangular layout and more than one of the rectangular layouts for each node being a leaf rectangular layout; and
the rectangle arranging circuit, routine, or application arranges each of the more than one leaf rectangular layouts into a larger leaf rectangular layout and then arranges the larger leaf rectangular layout and the more than one of the larger than a leaf rectangular layout for the subnodes of the node into a plurality of candidate layouts for the node.

5. The system of claim 4, wherein:
the node identifying circuit, routine, or application identifies each node that has a rectangular layout for each subnode, and does not have both more than one of the rectangular layouts for each node being larger than a leaf rectangular layout and more than one of the rectangular layouts for each node being a leaf rectangular layout; and
the rectangle arranging circuit, routine, or application arranges the rectangular layouts for the subnodes of the node into a plurality of candidate layouts for the node.

6. The system of claim 5, further comprising an aspect ratio adjusting circuit, routine, or application, wherein the rectangle arranging circuit, routine, or application only creates candidate layouts within a defined aspect ratio and, if the rectangle arranging circuit routine or application cannot arrange various rectangular layouts for the subnodes of the identified node, the aspect ratio adjusting circuit, routine, or application increases the defined aspect ratio.

7. The system of claim 6, wherein:
the node identifying circuit, routine, or application identifies each node that has a plurality of candidate layouts associated with that node; and
the layout testing circuit, routine, or application, for each identified node that has a plurality of candidate layouts associated with that node, selects the candidate layout for that node with the least amount of empty space as the solution layout for that node.

8. The system of claim 7, wherein, if the layout testing circuit, routine, or application has selected a solution layout for a root node of the tree data structure, the media associating circuit, routine, or application associates summary media that summarizes data within each leaf of the tree data structure with the respective location of each leaf within the solution layout.

9. A system for creating a 3D visualization comprising: a node identifying circuit, routine, or application that accesses a tree data structure and identifies qualities of nodes within the tree data structure; a set creating circuit, routine, or application that creates sets with which layouts may be associated; a set associating circuit, routine, or application that associates one or more sets of layouts with a node of the tree data structure; a layout constructing circuit, routine, or application that creates rectangular layouts for the leaves of the tree data structure; a layout size comparing circuit, routine, or application that compares dimensions of a plurality of layouts; a horizontal layout combining circuit, routine, or application that combines two layouts horizontally; a vertical layout combining circuit, routine, or application that combines two layouts vertically; a layout testing circuit, routine, or application that compares candidate rectangular layouts and selects a solution layout; and a media associating circuit, routine, or application that associates media with the solution layout to create a 3D visualization, wherein, if there are two candidate layouts with the least amount of empty space, the layout testing circuit, routine, or application selects the candidate layout with the smallest circumference as the solution layout for that node.

10. The system of claim 9, wherein:
the node identifying circuit, routine, or application identifies each leaf of a tree data structure;
the set creating circuit, routine, or application, creates a new set of layouts for each identified leaf;
the layout constructing circuit, routine, or application, for each identified leaf, creates a layout for that identified leaf and stores the created layout in the new set of layouts; and
the set associating circuit, routine, or application, for each identified leaf, associates the new set of layouts with the parent node of that identified leaf.

11. The system of claim 10, wherein:
the node identifying circuit, routine, or application identifies each node that has a single set of layouts associated with it; and
the set associating circuit, routine, or application, for each identified node that has a single set of layouts and no sets of layouts associated with any subnodes, associates that single set of layouts with the parent node of the identified node that has a single set of layouts and no sets of layouts associated with any subnodes.

12. The system of claim 11, wherein:
the node identifying circuit, routine, or application identifies each node that has more than one set of nodes associated with it;
the set creating circuit, routine, or application, for each identified node that has more than one set of nodes associated with it, creates a new set of layouts; and
the set associating circuit, routine, or application, for each identified node that has more than one set of nodes associated with it, associates the new set with that identified node that has more than one set of nodes associated with it.

13. The system of claim 12, wherein:
the horizontal combining circuit, routine, or application, selects a first set of layouts associated with that identified node, the first set of layouts containing a smallest layout, selects a second set of layouts associated with that identified node, other than the first set of layouts, that contains a smallest layout, horizontally combines a first layout from the first selected set of layouts with a first layout from the second selected set of layouts, and assigns the horizontally combined layout to the new set of layouts.

14. The system of claim 13, wherein, for each layout within the first selected set of layouts:
the horizontal combining circuit, routine, or application, for each layout within the second selected set of layouts, horizontally combines that layout from the first selected set of layouts with that layout from the second set of selected layouts; and
the layout size comparing circuit, routine, or application, for each layout within the new set for the identified node that has more than one set of nodes associated with it, compares the horizontally combined layout from the first selected set of layouts and the second set of selected layouts and that layout within the new set for the identified node that has more than one set of nodes associated with it;
wherein:
whenever the horizontally combined layout from the first selected set and the second selected set is larger than a layout within the new set for the identified node, the layout size comparing circuit, routine, or application discards the horizontally combined layout from the first selected set and layout from the second selected set;
whenever a layout within the new set for the identified node is larger than the horizontally combined layout from the first selected set and the second selected set, the layout size comparing circuit, routine, or application discards that layout within the new set for the identified node; and
if the layout size comparing circuit, routine, or application has compared the horizontally combined layout from the first selected set and the second selected set with every layout in the new set for the identified node without discarding the horizontally combined layout from the first selected set and the second selected set, the layout size comparing circuit, routine, or application adds the horizontally combined layout from the first selected set and the second selected set to the new set for the identified node.

15. The system of claim 14, wherein, for each layout within the first selected set of layouts:
the vertical combining circuit, routine, or application, for each layout within the second selected set of layouts, vertically combines that layout from the first selected set of layouts with that layout from the second set of selected layouts; and
the layout size comparing circuit, routine, or application, for each layout within the new set for the identified node that has more than one set of nodes associated with it, compares the vertically combined layout from the first selected set of layouts and the second set of selected layouts and that layout within the new set for the identified node that has more than one set of nodes associated with it;
wherein:
whenever the vertically combined layout from the first selected set and the second selected set is larger than a layout within the new set for the identified node, the layout size comparing circuit, routine, or application discards the vertically combined layout from the first selected set and layout from the second selected set;
whenever a layout within the new set for the identified node is larger than the vertically combined layout from the first selected set and the second selected set, the layout size comparing circuit, routine, or application discards that layout within the new set for the identified node; and
if the layout size comparing circuit, routine, or application has compared the vertically combined layout from the first selected set and the second selected set with every layout in the new set for the identified node without discarding the vertically combined layout from the first selected set and the second selected set, the layout size comparing circuit, routine, or application adds the vertically combined layout from the first selected set and the second selected set to the new set for the identified node.

16. The system of claim 15, wherein the layout size comparing circuit, routine, or application discards the first selected set and the second selected set.

17. The system of claim 16, wherein when the node identifying circuit routine or application determines that the root node has only one set of layouts associated with it, the layout testing circuit, routine, or application selects a smallest layout from the set of layouts associated with the root node as a solution layout.

18. The system of claim 17, wherein the media associating circuit, routine, or application associates summary media that summarizes the data within each leaf of the tree data structure with the respective location of each leaf within the solution layout.

* * * * *